(12) United States Patent
Shattil

(10) Patent No.: US 7,076,168 B1
(45) Date of Patent: Jul. 11, 2006

(54) METHOD AND APPARATUS FOR USING MULTICARRIER INTERFEROMETRY TO ENHANCE OPTICAL FIBER COMMUNICATIONS

(75) Inventor: Steve J. Shattil, Boulder, CO (US)

(73) Assignee: Aquity, LLC, San Diego, CA (US)

( * ) Notice: Subject to any disclaimer, the term of this patent is extended or adjusted under 35 U.S.C. 154(b) by 677 days.

(21) Appl. No.: 09/703,202

(22) Filed: Oct. 31, 2000

Related U.S. Application Data

(63) Continuation-in-part of application No. 09/022,950, filed on Feb. 12, 1998, now Pat. No. 5,955,992.

(60) Provisional application No. 60/163,141, filed on Nov. 2, 1999.

(51) Int. Cl.
*H04J 14/00* (2006.01)

(52) U.S. Cl. ............... 398/76; 398/78; 398/202

(58) Field of Classification Search ............ 385/29; 398/79, 68, 152, 82, 139, 76, 77, 78, 115, 398/89, 99, 202, 211; 375/144; 370/382
See application file for complete search history.

(56) References Cited

U.S. PATENT DOCUMENTS

| | | | |
|---|---|---|---|
| 4,628,517 A | 12/1986 | Schwarz | |
| 4,827,480 A | 5/1989 | Kowalski | |
| 5,003,545 A | 3/1991 | Kowalski | |
| 5,016,242 A * | 5/1991 | Tang | 398/76 |
| 5,191,459 A * | 3/1993 | Thompson et al. | 398/76 |
| 5,457,557 A * | 10/1995 | Zarem et al. | 398/116 |
| 5,519,692 A | 5/1996 | Hershey | |
| 5,521,937 A | 5/1996 | Kondo | |
| 5,563,906 A | 10/1996 | Hershey | |
| 5,712,716 A * | 1/1998 | Vanoli et al. | 398/34 |
| 5,793,413 A * | 8/1998 | Hylton et al. | 725/81 |
| 5,818,619 A * | 10/1998 | Medved et al. | 398/128 |
| 5,940,196 A * | 8/1999 | Piehler et al. | 398/91 |
| 5,955,983 A * | 9/1999 | Li | 342/54 |
| 5,960,032 A | 9/1999 | Letaief | |
| 6,008,760 A | 12/1999 | Shattil | |
| 6,058,105 A | 5/2000 | Hochwald | |
| 6,091,967 A * | 7/2000 | Kruys et al. | 455/557 |
| 6,097,712 A | 8/2000 | Secord | |
| 6,107,954 A * | 8/2000 | Li | 342/54 |
| 6,128,276 A | 10/2000 | Agee | |
| RE36,944 E * | 11/2000 | Li | 342/58 |
| 6,144,711 A | 11/2000 | Raleigh | |

(Continued)

OTHER PUBLICATIONS

Linnartz, "Synchronous MC-CDMA in Dispersive Mobile Rayleigh Channels," Proc. $2^{nd}$ IEEE Benelux Sig. Proc. Symposium, Hilvarenbeek, Mar. 23 2000.

(Continued)

*Primary Examiner*—Christina Y Leung
(74) *Attorney, Agent, or Firm*—Steven J Shattil

(57) ABSTRACT

A redundently modulated multicarrier protocol known as Carrier Interference Multiple Access (CIMA) is used in an optical-fiber network having wireless links at network nodes. CIMA is a protocol that can be used to create wireless protocols (such as TDMA and CDMA) having enhanced capacity and reduced system complexity. A CIMA optical-fiber network uses dispersion to enhance signal quality and facilitate switching. CIMA achieves both diversity benefits and capacity enhancements by providing redundancy in at least one diversity parameter while providing orthogonality in another diversity parameter. This basic operating principle of CIMA may be combined with multi-user detection to achieve frequency reuse and improved power efficiency. In the wireless link, diversity may be used to reduce the effects of small-scale fading on interferometry multiplexing.

22 Claims, 19 Drawing Sheets

U.S. PATENT DOCUMENTS

| | | |
|---|---|---|
| 6,192,068 B1 | 2/2001 | Fattouche |
| 6,211,671 B1 | 4/2001 | Shattil |
| 6,496,290 B1 * | 12/2002 | Lee .............................. 398/78 |
| 6,567,982 B1 * | 5/2003 | Howe et al. ................ 725/100 |
| 6,570,913 B1 * | 5/2003 | Chen .......................... 375/223 |

OTHER PUBLICATIONS

Yee, "Controlled Equalization of Multi-Carrier CDMA in an Indoor Rician Fading Channel," IEICE Trans. on Comm., Japan, vol. E77-B, No. 7, Jul. 1994.

Yee, "Wiener Filtering of Multi-Carrier CDMA in a Rayleigh Fading Channel," IEEE/ICCC PIMRC Conference, Hague, vol. 4, pp. 1344-1347 Sep. 19-23, 1994.

Yang, "Blind Joint Soft-Detection Assisted Slow Frequency-Hopping Multi-Carrier DS-CDMA," IEEE Trans. Comm., vol. 48, No. 9, Sep. 2000.

Hara, "Overview of Multicarrier CDMA," IEEE Communications Mag., Dec. 1997.

Frenger, "A Parallel Combinatory OFDM System," IEEE Trans. Comm., vol. 47, No. 04, Apr. 1999.

Saulnier, "Performance of an OPDM Spread Spectra Comm. System Using Lapped Transforms," IEEE, 1997.

Chang, "Wavelet-Based Multi Carrier CDMA for Personal Comm. Systems," IEEE, 1996.

Yee, "Multicarrier Code Division Multiple Access (MC-CDMA): A New Spreading Technique for Comm. Over Multipath Channels," Final Report for Micro Project 93-101.

Xu, "Performance of Multicarrier DS CDMA Systems in the Presence of Correlated Fading," IEEE, 1997.

Sourour, "Performance of Orthogonal Multicarrier CDMA in a Multipath Fading Channel," IEEE Trans. Comm., vol. 44, No. 3, Mar. 1996.

Kowalski, "Optical Pulse Generation With a Frequency Shifted Feedback Laser," Appl. Phys. Lett. 53(9), Aug. 29, 1988.

Kowalski, "Pulse Generation With an Acousto-Optic Frequency Shifter in a Passive Cavity," Appl. Phys. Lett. 50 (12), Mar. 23, 1987.

Bonnet, "Dynamics of Self-Modelocking of a Titanium-Saphire Laser With Intracavity Frequency Shifted Feedback," Optics Comm. 123 (1976) Feb. 1, 1996.

Bingham, "Multicarrier Modulation for Data Transmission: An Idea Whose Time has Come," IEEE Communications Mag., May 1990.

Slimane, "MC-CDMA With Quadrature Spreading Over Frequency Selective Fading Channels," IEEE, 1997.

Yee, "Multicarrier CDMA in Indoor Wireless Radio Networks," IEICE Trans. on Comm., Japan, vol. E77-B, No. 7, Jul. 1994.

* cited by examiner

METHOD AND APPARATUS FOR USING MULTICARRIER INTERFEROMETRY TO ENHANCE OPTICAL FIBER COMMUNICATIONS

This application claims priority to U.S. Provisional Application to Ser. No. 60/163,141, filed Nov. 2, 1999, and is a Continuation-In-Part of U.S. patent application Ser. No. 09/022,950, filed Feb. 12, 1998, now U.S. Pat. No. 5,955,992.

FIELD OF THE INVENTION

This invention relates generally to guided-wave optical communications and specifically to multicarrier optical-transmission protocols, such as Wavelength Division Multiplexing (WDM). The application of the invention is directed toward providing a multicarrier protocol that can be used for both waveguide and wireless communications.

BACKGROUND OF THE INVENTION

In WDM, optical carriers having different wavelengths are individually modulated. The transmission capacity of an optical-fiber transmission line is increased according to the number of wavelengths, which define WDM channels. A large number of WDM channels can be supported if the channels are closely spaced (e.g. 50 GHz).

WDM channels are transmitted over a single waveguide and demultiplexed by diffraction or filtering such that each channel wavelength is routed to a designated receiver. Optical amplifiers (such as doped fiber amplifiers) simultaneously amplify the optical channels, facilitating use of the WDM protocol.

Dense WDM systems require special add/drop multiplexer filters (ADM filters) to add and drop channels (wavelengths). At each node in the system, certain wavelengths on one fiber may be dropped onto a second fiber, and channels from a third fiber may be added. The number of WDM channels determines the number of nodes. However, dispersion, four-wave mixing, wavelength drift of transmission sources, and the difficulty of separating closely spaced wavelengths at a receiver restrict the number and spacing of the channels.

I. Dispersion

The principal limiting factor in high-rate communication systems is chromatic dispersion. Chromatic dispersion is characterized by a widening in the duration of pulses as they travel through a fiber. Dispersion is caused by the dependence of the effective index of the fiber on the wavelength of each wave transported. The variation in the index of refraction with respect to wavelength causes different channel wavelengths to travel at different speeds. This phenomenon is also known as group-velocity dispersion (GVD).

Increasing data-transmission rates severely limits the transmission distance because of the waveform distortion caused by GVD in optical fibers. Furthermore, when the transmission speed is increased, the optical power for transmission needs to be increased to maintain the required received optical-power levels.

Many techniques and devices have been devised to counter the effects of GVD. The goal of dispersion compensation is to change a nonlinear channel into a linear channel (at least for a specific range of wavelengths) in order to achieve the capacity of a linear channel. None of these references make use of the nonlinearity of the channel to achieve capacity that may exceed the theoretical limitation of a linear channel.

U.S. Pat. No. 4,677,618 describes a method of compensating for distortion of WDM data by a dispersive medium. Dispersion-compensation techniques include providing lengths of dispersion-compensating line in an optical network (U.S. Pat. No. 5,361,234) and providing dispersion-slope compensation, such as disclosed by J. A. R. Williams et al. in IEEE Photonics Technology Letters, Vol. 8. p. 1187 (1996) and K. Takiguchi et al. in Electronics Letters, Vol. 32 p. 755 (1996). However, these dispersion-compensation methods have relatively limited effectiveness with respect to bandwidth.

To minimize the dispersion value of optical signals in fiber, work is currently under way to transmit signals in the 1.55-μ range in a dispersion-shifted fiber. U.S. Pat. Nos. 5,943,151, 5,898,714, 5,877,879, and 5,828,478, describe methods of phase comparisons and synchronization to compensate for chromatic dispersion.

II. Other Distortions

Other types of distortion also occur. U.S. Pat. No. 5,847,862 describes shaping of amplifier outputs to offset depletion of high-frequency channels. A significant factor in signal-to-noise ratio (SNR) degradation in WDM is due to Raman crosstalk. U.S. Pat. No. 5,953,140 cancels out the effects of crosstalk by processing signals in the electrical domain after the WDM transmission has been demultiplexed. Also, smoothing the power variation of the optical signal transmitted through the fiber can reduce nonlinear effects. U.S. Pat. No. 5,589,969 addresses the problem of interference caused by four-wave mixing between different WDM signals by providing a non-periodic spacing between the signal wavelengths.

III. Wavelength Drift

WDM lasers require extremely tight manufacturing tolerances with respect to center wavelength and line width. There are significant problems with laser-wavelength drift resulting from environmental factors, such as temperature variations and aging. Wavelength drift causes substantial problems in distributed systems because each receiver needs to demultiplex signals from different transmitters and from different fiber lines, all of which independently operate under different and changing environmental conditions. Conventional WDM systems require strict manufacturing and environmental controls to stay within tolerance.

Efforts to improve WDM systems have focused on improving the wavelength stability of the transmitter lasers. U.S. Pat. No. 5,943,152 describes a method for stabilizing the wavelength of an optical source. U.S. Pat. No. 5,838,470 addresses the problem that WDM transmitters and receivers must be precisely tuned to predetermined fixed wavelengths. In the '470 patent, each transmitter transmits a synchronization signal that the receiver uses to determine the wavelength of the signals. These signal wavelengths are stored in a lookup table.

U.S. Pat. No. 5,894,362 includes a decoupling unit for decoupling a portion of the WDM signal from a fiber as a monitoring signal. A monitoring unit determines the spectrum of the WDM signal with an optical spectrum analyzer. The monitoring unit uses the spectrum information to control light sources such that the wavelength is constant for each signal. The monitoring unit also detects SNR and signal power, maintains received power levels, counts the number of channels in a WDM signal, measures the spacing between wavelengths, monitors any changes in the spectrum, and controls optical amplifiers to achieve a desired noise figure or maintain a flat gain.

U.S. Pat. No. 5,555,086 describes a sensor array used to monitor physical characteristics of an optical fiber. A two-mode signal is sent through the fiber. Each mode has a different propagation velocity to create an interference pattern at a sensor array. Changes in the interference pattern indicate changes in the physical characteristics of the fiber.

None of the references disclose a communication protocol wherein optical switching is controlled by relative frequencies and phases between multiple carrier signals. None of the references disclose an optical source that generates multi-frequency carrier signals that are identically affected by frequency drifts. None of the references describe a method of generating information signals from relative frequency and phase relationships between carrier signals in order to reduce the effects of carrier-frequency drifts.

IV. Insertion Loss

Insertion loss limits the number of sources that can be coupled into a fiber. Insertion loss limits the number of wavelength channels produced by multiple optical sources. U.S. Pat. No. 5,589,969 describes an array of passive resonant cavities (Fabry-Perot filters) that reduces insertion loss. The cavities can be used to demultiplex several received signal wavelengths and multiplex several different wavelengths into a single multichannel laser signal.

V. Switching

Virtual point-to-point connections are achieved with WDM when different frequency channels are routed to different locations. However, the number of locations is limited to the number of WDM channels.

Wavelength demultiplexers with the smallest channel spacing are the most difficult to fabricate. Small channel spacing also results in cross talk between channels. U.S. Pat. No. 5,680,490 uses a multi-stage array of demultiplexers and bandpass filters. The array still requires the use of expensive demultiplexers to separate closely spaced channels, and it increases the number of demultiplexers.

U.S. Pat. No. 5,778,118 describes the use of optical add-drop multiplexers for WDM systems. U.S. Pat. No. 5,854,699 discloses a switching technique involving the modulation of data and control signals onto the same optical carrier. U.S. Pat. No. 5,940,208 discloses a switchable fiber-optic device.

None of the references describe an interference relation between different carriers that can be used to receive baseband information signals.

VI. Frequency-Shifted Feedback

In the Optics Letters article "Broadband Continuous Wave Laser," applicant described a laser design that utilizes a traveling-wave frequency-shifted feedback cavity (FSFC) to circulate light through a gain medium. Light circulating through the FSFC is frequency shifted by an acousto-optic modulator (AOM) upon each pass through the cavity. A unique characteristic of this cavity is that, unlike a Fabry-Perot cavity, it does not selectively attenuate signal frequencies. In the thesis "A New Method for Generating Short Optical Pulses," applicant describes how an optical signal propagating through an FSFC is spread in frequency to generate broadband lasing. The amount of frequency spreading is proportional to the number of times that light circulates through the cavity. In the Applied Physics Letters article "Optical Pulse Generation with a Frequency Shifted Feedback Laser," applicant describes an interference condition in which the broadband output of a laser produces short optical pulses, which have a frequency that is related to the RF-shift frequency of an AOM.

VII. Carrier Interferometry

In U.S. Pat. No. 5,955,992, U.S. patent application Ser. No. 09/393,431, and PCT Pat. Appl. No. WO99/41871, which are hereby incorporated by reference, applicant describes a multicarrier protocol that uses interference characteristics between the carriers to convey baseband information signals. This protocol is known as Carrier Interference Multiple Access (CIMA). The CIMA protocol involves different carriers that are redundantly modulated and selected to provide a predetermined phase relationship. However, this redundancy does not diminish the bandwidth efficiency. In fact, superior bandwidth efficiency is achieved because the CIMA carriers combine in the time domain to produce short impulses. This results in orthogonality in the time domain.

In wireless systems, CIMA signals can be processed as both low-bandwidth and high-bandwidth signals simultaneously. This mitigates the effects of both intersymbol interference and multipath fading. The frequency-diversity of CIMA signals greatly reduces transmission power requirements and eliminates the effects of jamming interference. CIMA also simplifies multi-user detection. Unlike other spread-spectrum techniques that distribute user interference to all users in a communication system, CIMA confines user interference to adjacent users in the time-domain, thus making it simple to cancel. CIMA can also be used to construct other protocols, such as Direct-Sequence CDMA (DS-CDMA). However, unlike DS-CDMA, which requires fast serial processing to create a direct-sequence spreading code, CIMA uses a slow type of parallel processing to generate the exact same codes (but with all of the additional benefits of a CIMA signal). Slow parallel processing makes CIMA systems simpler and less costly to implement.

Another benefit of CIMA is the ability to transmit and receive signals in non zero-phase space, which is an interference condition at one or more time instants within a symbol interval in which the carrier signals corresponding to one data symbol cancel where similar carrier signals corresponding to a different data symbol constructively combine. CIMA signals are detectable by receivers that are tuned to the carrier frequencies and carrier-phase relationships of the carrier signals.

Frequency diversity in the CIMA protocol also enables spatial demultiplexing of the received CIMA signals without antenna arrays. Different carriers have different spatial gain distributions (in a multipath fading environment) due to their differences in frequency. Therefore, each transmitted signal has a unique spatial gain distribution represented by the individual complex amplitudes of its component carriers. A training sequence can be used to determine (and adjust) the spatial gain distributions of the CIMA carriers at one or more receivers. Received CIMA signals are then separated into their carrier components. The complex amplitude of each component includes spatial-gain terms and unknown information signals. The amplitudes are extracted from each carrier and processed in a cancellation system (described in U.S. patent application Ser. No. 08/279,050, PCT Appl. No. WO95/03686, U.S. patent application Ser. Nos. 08/862,859, 09/324,206, and 09/347,182, which are all incorporated by reference), which solves for the unknown signals.

VIII. Redundancy

The transmission protocol used in the present invention is related to CIMA. Although redundancy in transmission dimensions (such as frequency) is well known in the prior art, CIMA is unique because it provides benefits of frequency diversity via redundant transmissions in the frequency domain without sacrificing bandwidth efficiency.

U.S. Pat. No. 5,940,196 describes an optical-communication system that transmits the same information on two optical carrier signals having different frequencies and combines the signals at a receiver to increase the carrier-to-noise ratio. However this benefit is achieved at the expense of reducing bandwidth efficiency.

IX. Time-Division Multiplexing

The method of generating time-domain CIMA signals is distinct from Optical Time Division Multiplexing (OTDM). U.S. Pat. Nos. 5,654,812 and 5,331,451 describe OTDM, which involves using time-domain processes to generate information pulses modulated onto a carrier signal. Each carrier signal is transmitted and optically demultiplexed at a receiver.

X. Pulse Formation

An ideal optical pulse consists of an envelope of a fixed-frequency carrier that is modulated according to a given temporal profile. G. P. Agrawal (Nonlinear Fiber Optics, Academic Press Inc. section 3, paragraph 2, pages 54–64) shows that in the absence of chirping, the spectral amplitude is minimized with respect to the pulse duration. Chirping is a frequency variation of the optical carrier enveloped by the laser-generated pulse.

Soliton transmission techniques are used to mitigate dispersion. Soliton-type pulses cause nonlinear variations in the refraction index of an optical medium due to the high power of the solitons, resulting in a counteracting of the effects of chromatic dispersion. The objective of time-domain dispersion-compensation techniques is to reduce the amount of pulse spreading in an optical fiber.

None of the prior-art references teach a method for using dispersion to reduce the duration of a pulse as it propagates through an optical medium.

SUMMARY OF THE INVENTION

A first object of the invention is to provide a bandwidth-efficient communication protocol that is appropriate for both waveguide and wireless communications. A protocol that is common to waveguide and wireless systems will facilitate local-access services and other applications that require transmissions to be converted from waveguide to free space and from free space to waveguide.

The first object is accomplished by using a redundant multicarrier protocol. CIMA is a redundant multicarrier protocol proposed for wireless applications. The CIMA protocol enables superior bandwidth efficiency, interference rejection, frequency diversity, power efficiency, and security compared to any other wireless protocol. CIMA can also be used to create other protocols, such as CDMA.

A redundant multicarrier protocol (such as CIMA) used in a waveguide provides superior performance compared to WDM. The benefits of a redundant multicarrier protocol used in a waveguide communication system include substantially increased capacity, simplified modulation schemes, reduced insertion loss from coupling transmit sources to the waveguide, a large number of channels, simplified switching, and reduced receiver complexity.

A benefit of using a redundant multicarrier protocol in a communication system that comprises both waveguide and wireless systems is that a protocol conversion is unnecessary when the transport medium changes from waveguide to free space (or free space to waveguide). Consequently, a second objective of the invention is to provide a communication system that uses the same protocol for both waveguide and wireless communications. The CIMA protocol enables conventional wireless protocols, such as CDMA, to be constructed from multiple carriers. Therefore, conventional wireless protocols can be conveyed through waveguides with the benefits of the most efficient waveguide transmission protocol.

A third objective of the invention is to provide a protocol that has the best performance of both waveguide and wireless protocols. The third objective is accomplished by using CIMA.

A fourth objective is to provide a waveguide communication system that uses a single optical source to generate and modulate multiple carriers that are inserted into the waveguide. The importance of using a single source coupled to the waveguide is that it reduces insertion loss. The fourth objective is accomplished by using a multicarrier or multimode signal source (such as a frequency-shifted feedback or mode-locked laser) to generate redundant multicarrier transmissions. A redundant multicarrier protocol allows time-domain modulation of the combined signal output by the signal source. In contrast, WDM requires that each carrier be modulated separately, thus requiring the coupling of multiple modulated carriers into the waveguide.

A fifth objective of the invention is to provide a multicarrier waveguide communication system with a large number of carrier signals having closely spaced wavelengths. Practical implementations of WDM are limited to a few dozen wavelengths. In WDM, 50 GHz between carrier frequencies is considered to be a close spacing. The CIMA protocol provides for larger numbers of closely spaced carrier signals. A laser with an FSFC can be used to generate optical CIMA signals. An FSFC laser ("Optical Pulse Generation with a Frequency Shifted Feedback Laser," Applied Physics Letters, 1988) can generate at least 6000 carrier signals having a frequency spacing of 110 MHz.

A sixth objective of the invention is to use nonlinearity (such as chromatic dispersion) in the waveguide to increase transmission capacity. The invention achieves the sixth objective by exploiting the superposition of multi-frequency carrier signals in a dispersive medium. The phase relationship between two or more signals propagating in a dispersive medium changes with respect to differences in velocities of the carrier signals. When the signals are in phase (a zero-phase condition), the superposition of the signals produces a maximum. As the signals move out-of-phase (a non zero-phase condition), the superposition of the signals drops to zero.

The invention includes methods and apparatus for transmitting multicarrier signals having a predetermined phase relationship upon insertion into a dispersive waveguide. As the signals propagate in the waveguide, they combine in phase at one or more predetermined locations. These locations may be nodes. The signals combine destructively at other nodes, thus being undetectable or minimally detectable by receivers at those nodes. Therefore, the same carrier-signal bandwidth may be exploited at multiple locations along a dispersive waveguide without providing significant interference at any of the other locations. Receivers may be responsive to more than one phase relationship between received carriers in order to make use of the greater bandwidth provided by the nonlinear waveguide. The bandwidth reuse factor can approach the number of carrier frequencies used in the waveguide.

A seventh objective of the invention is to provide a substantial increase in the number of virtual channels in a waveguide communication system. The number of virtual channels in a WDM system is limited to the number of carrier signals. Because this number is relatively small, add/drop switches are required to provide frequency (channel) reuse in the WDM system.

The seventh objective is accomplished by making use of phase relationships between individual carrier signals to define different channels. A virtual switch is enabled by the phase relationship imparted to the carriers by the transmitter. The phase relationship defines the destination of the information signals modulated onto the carriers because it determines the location(s) in the waveguide where the signals combine in phase to produce a detectable signal. The number of virtual switches (destinations) may be at least the number of carrier frequencies, which can exceed 6000.

An eighth objective of the invention is to eliminate the requirement for stable optical sources (and associated wavelength-control systems) in an optical communication system. This objective is also related to a ninth objective, which is to eliminate the need for wavelength demultiplexers at receivers in the system. The eighth and ninth objectives are achieved by at least one embodiment of the invention in which a redundant multicarrier protocol is used. Information signals conveyed using CIMA depend on the relative phase and the frequency separation of the carriers. The carrier frequencies can drift without changing the relationships that affect the information signal. If the dispersion characteristics of the carrier signals are not changed significantly, the destination(s) of the information signal will not change. A simple receiver may be used at one or more destinations to detect a constructive-interference information signal. The simple receiver comprises an envelope detector and does not require a wavelength demultiplexer.

A tenth objective of the invention is to provide a multi-user detection scheme to reduce interference and increase capacity. The tenth objective is achieved in one aspect of the invention by the process of time-domain processing of the received signals. Reception of signals in adjacent nodes may be performed (either by direct detection in adjacent nodes or dispersion-compensation shifting of received signals at one node) to provide interference-cancellation signals. The cancellation signals are applied to a desired signal to cancel the effects of multi-user interference.

The tenth objective is also achieved by a second aspect of the invention, which exploits frequency diversity in multiple received signals to cancel or otherwise separate interfering signals. Variations in the complex amplitude of each carrier signal results from propagation effects, such as reflections, dispersion, and frequency-selective attenuation. Therefore, different transmitter locations along the waveguide may result in distinct frequency-versus-amplitude profiles of the transmitted signals received by a receiver. Transmitters may also apply amplitude variations to the transmitted signals to help receivers determine the source(s) of received transmissions. Training sequences or estimation techniques may be used to determine the relative amplitude of the frequency components of the different transmitted signals at one or more receivers. Knowledge of the relative amplitudes can be used to separate unknown information signals from the received signals. A cancellation method and/or a constellation technique may be performed to determinate the values of the unknown signals.

A variation of the second aspect of the invention involves using receivers at multiple receiver sites. The frequency-diversity method using cancellation can explicitly solve for a number of unknowns that equals the number of carrier frequencies multiplied by the number of receivers. The receivers each have a different location along the waveguide. Using one of the cancellation methods, each receiver generates a set of equations having a number of unknowns (typically equal to the number of carrier frequencies). If the number of unknowns is greater than the number of equations, then the equations generated by multiple receivers are combined to produce a number of algebraically distinct equations that is greater than or equal to the number of unknowns.

The multi-receiver frequency-diversity technique may also be implemented in a free-space communication system and method. In a wireless communication system, spatially separated wireless receivers (such as antennas) are used instead of the waveguide receivers.

An eleventh objective of the invention is to provide a security protocol that makes communications in both waveguides and free space difficult to intercept. The invention achieves the eleventh objective by transmitting phase-based destination information on carrier signals that cancel in a waveguide at locations other than the intended destination. In free space, non-zero phase-space transmissions are not detectable by conventional receivers. The inability to detect a signal makes it difficult to intercept.

A twelfth objective of the invention is to provide cancellation of periodic-phase carriers in order to increase system capacity. The twelfth objective is accomplished by an interferometry switch, which transmits a cancellation signal to null an undesired signal. A transmission received by a receiver can be used to generate a cancellation signal that nulls any residual signal levels of the received signal that would otherwise occur farther down the waveguide. The cancellation signal may be transmitted over a second waveguide that is shorter than the primary waveguide to compensate for delay between reception of the desired signal and transmission of the cancellation signal. The cancellation signal may be transmitted at a different (lower) frequency band that has a higher propagation velocity. A receiver that receives a frequency-shifted cancellation signal may convert the signal back to its original frequency. The cancellation signal may be transmitted over a wireless link.

The objectives of the present invention recited above, additional objects, and/or alternative objects depend on particular embodiments and applications of the invention, and are apparent in the description of the preferred embodiments.

DETAILED DESCRIPTION OF PREFERRED EMBODIMENTS

The following description is directed toward the implementation of an optical-fiber network having a wireless interface at each node. The implementation of the invention can be directed generally to waveguide and wireless applications.

Figure 1:
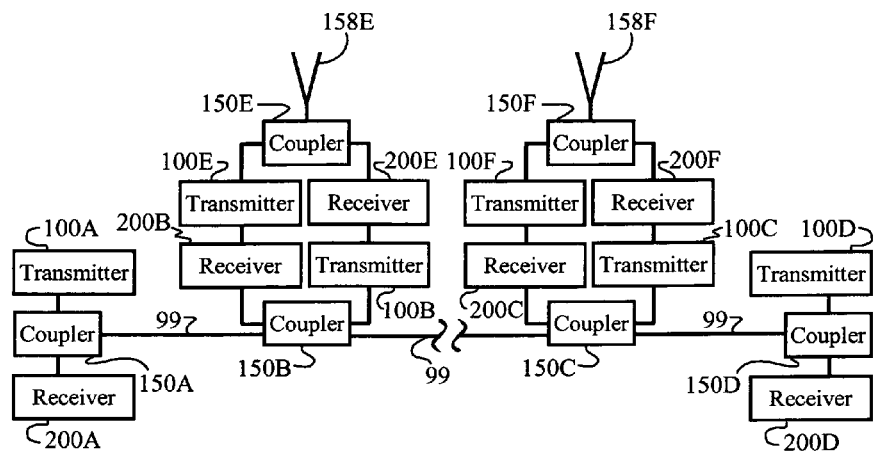
FIG. 1 is a schematic of a high-capacity optical-fiber network that provides last-mile information delivery to individual users via wireless links.

FIG. 1 shows the basic components of a high-capacity optical-fiber network that provides last-mile information delivery to individual users via wireless links. A plurality of couplers 150A, 150B, 150C, and 150D have different locations in a communication channel 99 that supports the propagation of electromagnetic communication signals.

A coupler (such as couplers 150A, 150B, 150C, and 150D) couples electromagnetic signals into the communication channel 99 or couples electromagnetic signals out of the communication channel 99. Couplers can include lenses, antennas, any type of electromagnetic-wave radiator, and any type of electromagnetic-wave receptor. A coupler may be a directional coupler.

The communication channel 99 is any type of transport medium for electromagnetic waves used for communications. Any kind of electromagnetic wave, such as optical (including infrared) and RF (including microwave), may be used for communication. The channel 99 may be a free-space propagation environment, a guided-wave environment, or both. The channel 99 may cause signal distortion and intersymbol (or intercede) interference.

The material through which the communication signals propagate, the shape and dimensions of the material, and the mode of transport defines a transport medium. The characteristics of the propagation environment can be represented by electrical characteristics, such as resistance, inductance, and capacitance. Different types of waveguides represent different transport mediums. Different modes of transport, such as guided wave and free space (i.e., wireless), define different transport mediums.

The communication channel 99 shown in FIG. 1 is an optical fiber, which is a type of waveguide. Other types of waveguides include transmission lines (such as coaxial, microstrip, and twisted pair), parallel plate, channelized free space, and any linear or nonlinear medium that directs propagation of electromagnetic waves by refraction or reflection.

Each coupler 150A, 150B, 150C, and 150D in FIG. 1 is coupled to a transmitter 100A, 100B, 100C, and 100D and a receiver 200A, 200B, 200C, and 200D. One or more of the couplers (such as couplers 150A, 150B, 150C, and 150D) may couple only a transmitter or a receiver to the channel 99. One or more of the couplers (such as couplers 150A, 150B, 150C, and 150D) may couple additional parts of the communication channel 99 (such as optical fibers) to the part of the communication channel 99 shown in FIG. 1.

The receivers 200B and 200C are each coupled to a transmitter 100E and 100F. The transmitters 100E and 100F are each coupled to a coupler 150E and 150F. The couplers 150E and 150F provide an interface to a wireless channel (not shown) and couple transmission signals provided by the transmitters 100E and 100F into the wireless channel (not shown). Each coupler 150E and 150F includes an antenna 158E and 158F. The couplers 150E and 150F receive signals from the wireless channel (not shown) and convey the received signals to a receiver 200E and 200F. The receivers 200E and 200F are coupled to the transmitters 100B and 100C, which couple the received wireless signals into the optical fiber 99.

The uniqueness of the present invention shown in FIG. 1 is based, in part, on the types of communication signals used. Consequently, the design of the transmitters and receivers are also unique.

Figure 2:
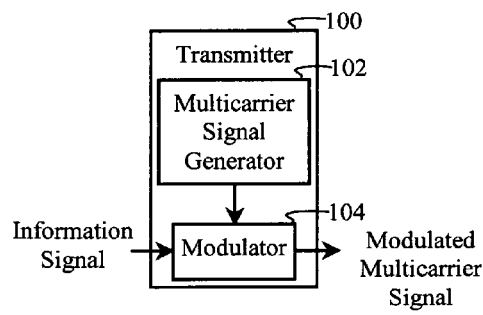
FIG. 2 is an illustration of basic components of a transmitter that generates redundantly modulates carrier signals.

FIG. 2 shows a transmitter 100 of the present invention. A multicarrier-signal generator 102 is coupled to an information-signal modulator 104. The transmitter 100 may include a coupler (not shown) to a communication channel (not shown). The signal generator 102 may include signal-processing systems (not shown), such as, but not limited to weighting systems, transform generators, modulators, filters, and feedback systems. The signal generator may include a polarization controller (not shown).

The signal generator 102 produces a multicarrier signal. A multicarrier signal is defined as a plurality of carrier signals having different orthogonalizing properties (also referred to as orthogonality parameters or diversity parameters), such as time, differential power, location, mode, frequency, polarization, phase space, directivity, spread-spectrum code, or any combination of orthogonalizing properties. An orthogonalizing property (such as polarization) may not be completely orthogonal. For example, polarized signals having less than 90-degrees separation between them have cross-polarization (interference) terms. A multicarrier signal may be defined by any signal property that affects propagation characteristics, such as velocity, reflections, and refraction. Each multicarrier signal may be defined by a different propagation mode.

A multi-frequency signal generator is a type of multicarrier-signal generator. A multi-frequency signal generator is any signal generator that generates electromagnetic signals having frequency-diverse characteristics, such as multiple signal frequencies. Frequency-diverse signals may have diversity according to other diversity parameters, such as time, location, mode, polarization, or diversity parameters resulting from any other orthogonalizing property. The multicarrier signals may have any frequency in the electromagnetic frequency spectrum. However, for optical waveguide applications it is assumed that the signals are optical. In free-space applications, the signals are assumed to be RF (including microwave) or optical (including infrared).

In this case, the signal generator 102 produces a plurality of carrier signals having a plurality of frequencies. The signal generator 102 includes a frequency-diverse transmission source (not shown). A frequency-diverse signal may be a multicarrier, broadband, frequency-hopped, or chirped signal. The transmission source (not shown) may be any type of frequency-diverse electromagnetic signal source, which may include mode-locked lasers, laser arrays, FSFCs, frequency-shifted feedback lasers, or broadband sources. A broadband source (not shown) may include a wavelength demultiplexer (not shown) for separating continuous-wave radiation into carriers having discreet frequencies or discreet frequency bands.

The signal generator 102 may include any type of multi-frequency optical source. Many optical sources disclosed in the prior art are appropriate for the signal generator 102 and are incorporated herein by reference: U.S. Pat. No. 5,881,079 describes a laser cavity having a frequency-routing device comprising controllable frequency-selective pathways to allow multiple lasing frequencies to be supported. U.S. Pat. No. 5,936,752 describes a method of coupling light from a broadband source into a wavelength demultiplexer for creating discreet wavelengths. A broadband source may be provided by U.S. Pat. No. 5,923,683, which discloses a coherent source of white light. U.S. Pat. No. 5,347,525 describes a mode-locked laser for providing multiple signal wavelengths. U.S. Pat. Nos. 5,450,427 and 5,923,686 describe mode-locked lasers used to create short pulses by either active or passive mode locking.

Mode-locking lasers have a modulator in the laser cavity to provide optical losses or gains at a frequency corresponding to the separation frequency between two adjacent longitudinal cavity modes. In active mode-locking lasers, the emitted pulse frequency depends on the excitation frequency of the modulator. A mode-locked laser may be a linear or ring-cavity laser. Active mode-locking systems can produce a large number of locked pulses that simultaneously travel through a ring cavity, and therefore enable the pulse frequency to be much higher than in passive-type devices.

Optical-fiber laser devices have an active electro-optical modulation device in an optical path forming a laser cavity. Harmonic mode locking occurs when the modulation frequency of the device is an integer-valued multiple of the intermode separation frequency. Harmonic mode locking is particularly useful in fiber lasers because it enables shorter pulses to be produced.

Figure 3A:
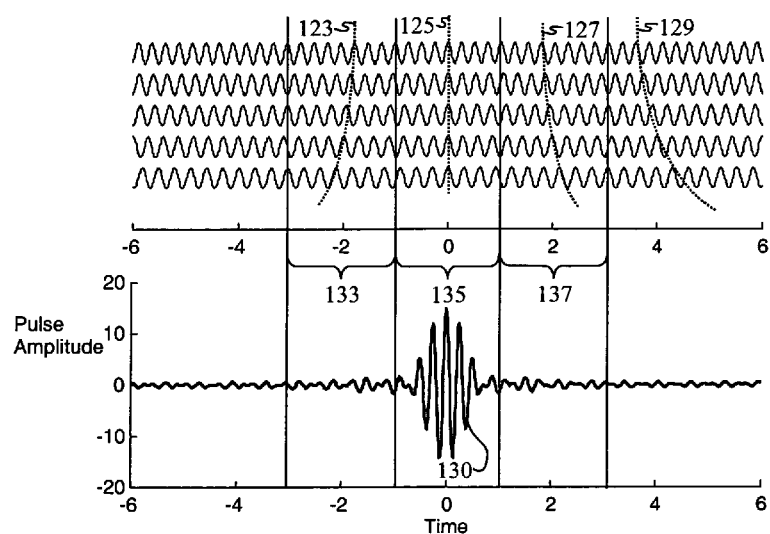
FIG. 3A is a plot of a plurality of multi-frequency carriers and a superposition of the carriers.

FIG. 3A shows a composite signal 130 resulting from the superposition of a plurality of multi-frequency carriers. The superposition of multi-frequency carriers is described by U.S. Pat. No. 5,955,992, which is hereby incorporated by reference. A composite signal is defined herein as any superposition of a plurality of signals.

The composite signal 130 may be a CIMA signal, which is a signal comprised of carrier signals having predetermined frequency and phase relationships. FIG. 3B shows a typical square-wave time-domain pulse. FIG. 3C is a frequency-domain plot of the square-wave pulse shown in FIG. 3B. FIG. 3D shows a CIMA pulse in the time domain. A frequency spectrum corresponding to the CIMA pulse is shown in FIG. 3E. FIG. 3D and FIG. 3E show that CIMA signals may be added to either or both the frequency domain and the time domain.

CIMA supports both orthogonal and pseudo-orthogonal waveforms. Basic forms of CIMA can be used to double capacity in traditional TDMA systems and simultaneously improve system performance in a multipath environment. CIMA allows systems to achieve the benefits of frequency diversity in which they previously could only benefit from path diversity. Similarly, CIMA allows conventional DS-CDMA systems to achieve the performance benefits of MC-CDMA.

Figure 3F:
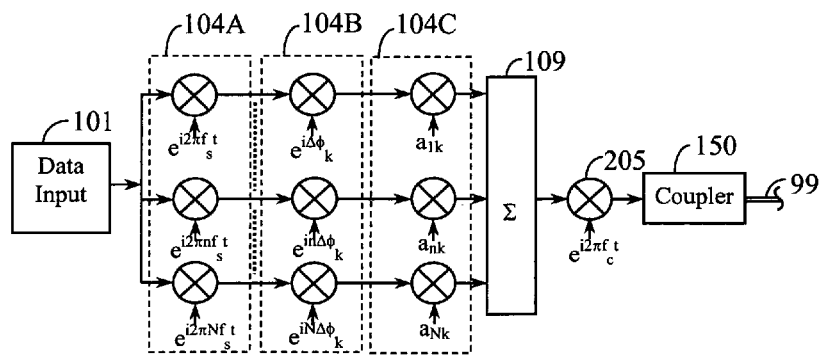
FIG. 3F is a flow diagram representing a method of generating CIMA signals.
Figures 3B, 3C:
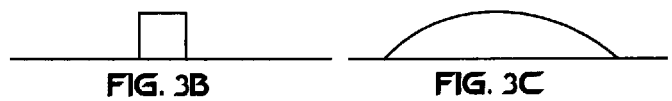
FIG. 3B is a plot of a square-wave time-domain pulse.
FIG. 3C is a frequency-domain plot of the square-wave pulse shown in FIG. 3B.
Figures 3D, 3E:
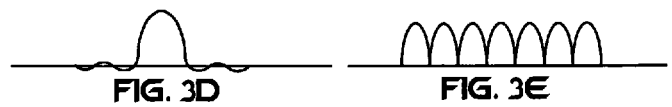
FIG. 3D is a time-domain plot of a CIMA pulse.
FIG. 3E is a frequency-domain plot of the CIMA pulse shown in FIG. 3D.

FIG. 3F shows a method for generating CIMA signals. An information signal $s_k(t)$ (from an input data source 101) intended for a $k^{th}$ user is split and modulated onto N carriers in a first modulation step 104A. In a second modulation step 104B, a plurality of complex weights is applied to the modulated carriers. The complex weights include phase shifts (or delays). Unlike a chip sequence in MC-CDMA (which uses binary values, such as ±1), CIMA signals use values of $e^{in\Delta\phi_k}$. In an optional third modulation step 104C additional weights $a_{nk}$ are applied to the carriers. The weights $a_{nk}$ may include windowing weights, channel-compensation values, and/or weight values that facilitate signal separation by cancellation or constellation methods at a receiver (not shown). The modulation steps 104A, 104B, and 104C may be performed in any order and may be combined.

A CIMA signal corresponding to the superposition on N carriers uniformly spaced in frequency by $f_s$ has a waveform envelope according the equation:

$$E(t) = \left| \frac{\sin(N\pi f_s t)}{\sin(\pi f_s t)} \right|$$

The CIMA envelopes are periodic with a period of $1/f_s$. The mainlobe of the envelope has a width of $2/Nf_s$, and the N−1 sidelobe widths are $2/Nf_s$. Applying a phase shift of $n\Delta\phi_k$ to each $n^{th}$ carrier shifts the CIMA envelope in time by $\Delta t = \Delta\phi_k/2\pi f_s$. Therefore N signals can be positioned orthogonally in time. The phase shifts provide the necessary phase relationships to create the desired timing of the information signal received by at least one receiver (not shown).

The cross correlation between users is:

$$R_{cc}(\tau) = \frac{1}{2f_s} \frac{\sin(N 2\pi f_s \tau/2)}{\sin(2\pi f_s \tau/2)} \cos((N-1)2\pi f_s \tau/2)$$

where $\tau$ is the time shift between envelopes. Zeros occur at $k/Nf_s$, k=1, 2, ..., N−1 and $(2k-1)/2(N-1)f_s$, k=1, 2, ..., N−1. CIMA can support N orthogonal users. If additional users or signals need to be accommodated, CIMA provides N−1 additional positions to place signals.

Modulated carriers may be combined in a combining step 109. The combined signals may be up converted in an up-conversion process 205, which may include mixing with a carrier signal having a frequency $f_c$. The carrier signals are then coupled into a communication channel 99 by a coupling process 150.

A CIMA signal has a number of carrier signals that may each have a bandwidth that is less than the coherence bandwidth of the communication channel. The coherence bandwidth is the bandwidth limit in which correlated fading occurs. The total bandwidth of the CIMA signal preferably exceeds the coherence bandwidth.

CIMA signals may be spaced in frequency by large amounts to achieve a large system bandwidth relative to the coherence bandwidth. In this case, CIMA signals make use of the frequency diversity parameter to achieve uncorrelated fading. However, any diversity parameter or combination of diversity parameters may be used to achieve uncorrelated fading over the system bandwidth (or even between individual carriers). For example, the system bandwidth of a group of CIMA carriers may be defined by the coherence bandwidth of one or more subchannels, such as spatial subchannels. Carriers that are closely spaced in frequency may have uncorrelated fading if they are transmitted from different locations or have different values of directivity. CIMA carriers transmitted from different locations may have different fades over each spatial subchannel and therefore can benefit from diversity combining at a receiver (not shown).

Figures 3G, 3H:
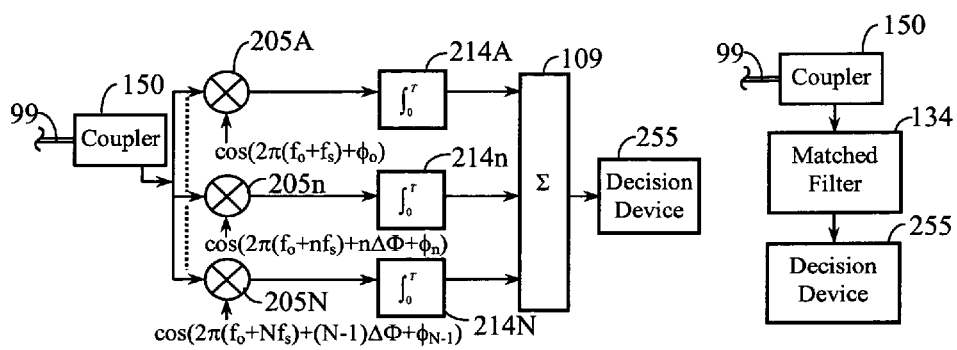
FIG. 3G is a schematic of a CIMA receiver.
FIG. 3H is a schematic of a CIMA receiver having a single matched filter.

A CIMA receiver is shown in FIG. 3G. CIMA signals are coupled out of a communication channel 99 by a coupler. Information signals are separated from each carrier by a plurality of down converters, such as down converters 205A, 205n, and 205N. The down converters 205A, 205n, and 205N may include a filter bank. In this case, the down converters 205A, 205n, and 205N project the received signals onto the orthonormal basis of the transmitted signals. Down converters (such as the down converters 205A, 205n, and 205N) may additionally compensate for channel distortion and/or addressing. The down converters 205A, 205n, and 205N may apply windowing or other filtering processes to the received signals.

Signals output from the down converters 205A, 205n, and 205N may be sampled by a plurality of samplers 214A, 214n, and 214N before being combined in a combiner 109. A decision device 255 detects the combined signals. The decision device 255 may be part of the combiner 109. The decision device 255 may perform multi-user detection or multi-channel detection and may perform any combination of cancellation and constellation processes to determine the value(s) of received signals.

FIG. 3H shows a CIMA receiver having a single matched filter 134. The matched filter 134 may optionally provide time limiting (gating) to the received signals before being processed by a decision device 255.

Figure 4A:
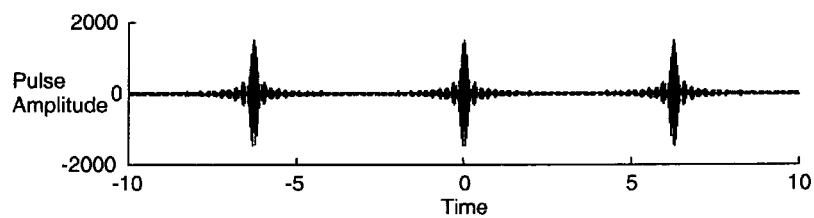
FIG. 4A is a plot of a composite signal resulting from a superposition of carrier signals having an equal frequency spacing.
Figure 4B:
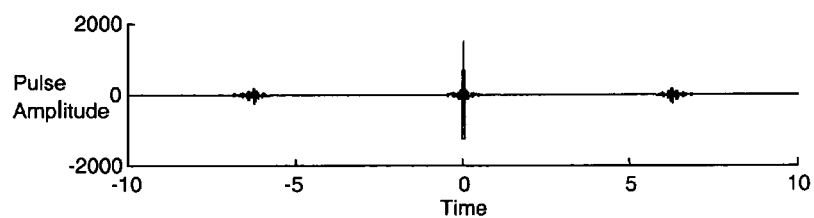
FIG. 4B is a plot of a composite signal resulting from a superposition of carrier signals having carrier frequencies that are unequally spaced.

FIG. 4A and FIG. 4B show composite signals resulting from superpositions of equally spaced carrier frequencies and unequally spaced carrier frequencies, respectively. Equally spaced carrier frequencies produce a composite signal that has periodic pulses. Unequally spaced-in-frequency carriers produce a non-periodic composite signal that has reduced sidelobe levels. In WDM, unequal spacing of channels (with respect to wavelength) is desirable because it reduces four-wave mixing.

Unequally spaced carrier signals refer to any type of sparse or ultra-sparse spacing, such as referred to in array processing, but applied to frequency or wavelength spacing of the carriers. Unequal spacing includes random spacing, non-redundant spacing, or any type of spacing determined by a nonredundant mathematical relation, such as prime numbers, $2^n$ relationships, or Fibonocci series.

The multicarrier-signal generator 102 or the modulator 104 may provide a frequency-versus-amplitude windowing function to the carrier signals. Windowing functions include spatially variant apodization, and any other methods of reducing sidelobes, such as described in U.S. Pat. No. 5,955,992.

The modulator 104 may modulate the carrier signals with an information signal. The modulator 104 may use the carrier signals to modulate the information signal. The modulator 104 may use any type of modulation scheme, such as AM, FM, ASK, FSK, PSK, PAM, TOM, Pulse Position Modulation, and any type of differential modulation.

Information signals are communication signals that are unknown (or have at least one unknown characteristic) at a receiver prior to transmission. The information signal may be analog or digital. The information signal may be a baseband information signal, an information signal modulated with an intermediate frequency, or a coded information signal that has been encoded with any combination of encryption, error-correction, and spread-spectrum codes.

The modulator 104 may provide weights to each of the carriers according to a predetermined code. The coded weights may be applied to the carriers in order to generate a predetermined time-domain profile, such as a direct-sequence signal. A preferred embodiment of the invention includes a process of applying complex weights to a multicarrier signal in order to create a predetermined time-domain signal. A predetermined time-domain signal (or profile) is defined herein as a specific shape of at least one signal parameter, such as amplitude, frequency, polarization, and phase in the time domain. The time-domain shape may be characterized by any signaling protocol, such as TDMA and CDMA.

Although carriers may be modulated with respect to codes, or information signals may be modulated onto the carriers within multiple time intervals or having different time offsets, the carriers are redundantly modulated with at least one information signal. In this specification, redundantly modulated multicarrier signals describe any of a set of signals wherein at least one information signal is modulated onto a plurality of carrier signals having different values of at least one diversity parameter. A modulator may simultaneously modulate the carriers with the information signal, or it may modulate each carrier independently. The carrier signals may be modulated at different time intervals. The carriers may be modulated with an encoded information signal. The carriers may be modulated non-redundantly or quasi-redundantly with spreading, error-correction, or encryption codes in addition to being redundantly modulated with the information signal(s).

Figure 5A:
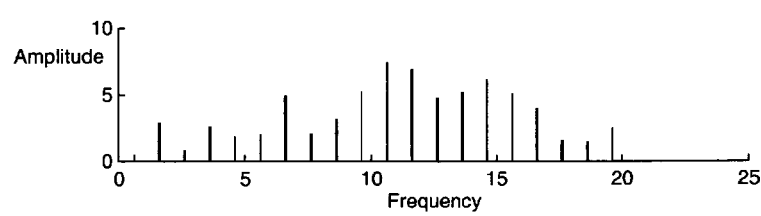
FIG. 5A is a plot of relative amplitudes of a set of multi-frequency carriers that produce a composite signal 130 (shown in FIG. 5B) having time-domain characteristics of a direct-sequence CDMA signal.
Figure 5B:
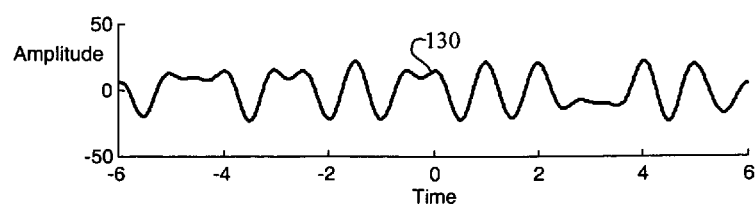
FIG. 5B is a time-domain plot of a superposition of the carrier signals shown in FIG. 5A.

FIG. 5A shows the relative amplitudes of a set of multifrequency carriers that produce a composite signal 130 (shown in FIG. 5B) having time-domain characteristics of a direct-sequence CDMA signal. If the carriers are uniformly spaced in frequency, then the time-domain signal is periodic. The number of direct-sequence chips in the time-domain signal may be proportional to the number of carrier signals. The bandwidth of the time-domain sequence is related to the bandwidth of the carriers, which is related to the number and spacing of the carriers.

Figure 6A:
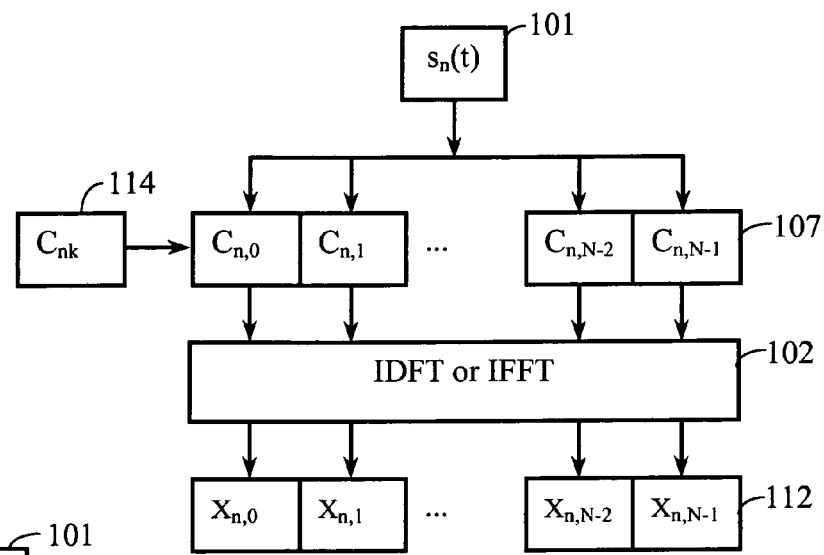
FIG. 6A is a diagram of a transmission method performed by a multicarrier transmitter.

FIG. 6A shows a multicarrier transmitter and transmission method of the present invention. An $n^{th}$ information signal $s_n(t)$, such as for an $n^{th}$ user, is applied to an $n^{th}$ code $c_n$ having N chips $c_{kn}$ (k=0 to N−1). The information signal $s_n(t)$ may modulate the code or it may be modulated by the code $c_n$.

A code generator 114 provides the N chips $c_{kn}$ to a serial-to-parallel converter 107 that arranges the chips $c_{kn}$ to parallel modulate each of a plurality of carrier signals generated by a carrier-signal generator 102. If the carriers are multi-frequency carriers, the carrier-signal generator 102 may be represented by the operation or implementation of a digital method for generating multi-frequency carriers, such as an inverse Discreet Fourier Transform or an inverse Fast Fourier Transform. Each chip $c_{kn}$ may be applied to a frequency bin of a transform process. The chips $c_{kn}$ may have binary, real, or complex values. The modulated carriers are optionally coupled to an output processor 112, which processes the carriers prior to coupling them into a communication channel (not shown).

The code generator 114 can be used as an information-signal encoder or a carrier encoder. An information signal may be used to modulate at least one code sequence. The code generator 114 may be a multi-stage code generator. Code generators may include one or more N-point transforms. N-point transforms include Discrete Fourier Transforms (DFT), Fast Fourier Transforms (FFT), Walsh Transforms (WT), Hilbert Transforms (HT), Randomizer Transforms (RT), Permutator Transforms (PT), Inverse DFTs, Inverse FFTs, Inverse WTs, Inverse HTs, Inverse RTs, Inverse PTs, and any other reversible transform.

The output processor 112 may combine the carriers and/or provide additional processing, such as filtering, interleaving, up converting, down converting, coding, weighting, amplifying, and mixing. A multicarrier signal may appear as a continuous broadband signal (in the frequency domain) if the carriers are modulated by a signal that has a large bandwidth with respect to carrier-frequency separation.

A direct-sequence time-domain signal is produced by an appropriate selection of chip values $c_{kn}$. Therefore, the generation of the periodic time-domain chip sequence does not require any time-domain processing. The only time-domain processing involves the modulation of the time-dependent information signals $s_n(t)$ onto the carriers. This multicarrier method of generating CDMA signals enables ultra-wideband CDMA to be deployed without the high-speed processing requirements of conventional direct-sequence chip generation.

Figure 6B:
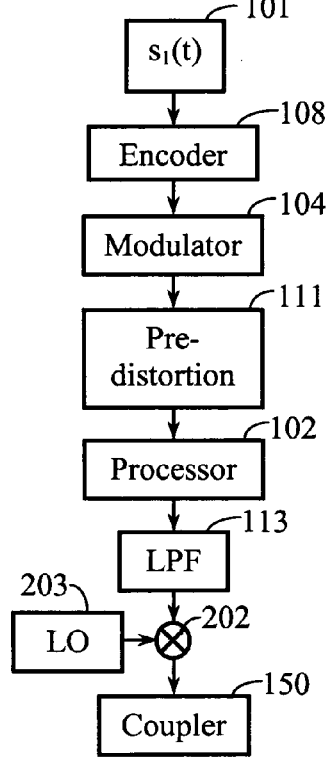
FIG. 6B is a flow diagram of the steps performed by an alternative embodiment of a multicarrier transmitter.

FIG. 6B illustrates an alternative embodiment of a transmitter 100 of the invention. Some of the components shown in FIG. 6B may be separate from the signal generator 102 and modulator 104 shown in FIG. 2, or they may be integrated into those components 102 and 104. Therefore, the simplicity of the transmitter 100 illustrated in FIG. 2 is meant to convey that there is a broad range of transmitter designs that can be used to generate redundantly modulated multicarrier signals. Furthermore, at least some of the basic principles behind the transmitter's 100 operation are applicable to transmitters that produce different types of electromagnetic signals and transmitters that are coupled to different kinds of communication channels.

An information-signal source 101 provides information signals $s_n(t)$ to an encoder 108, which may digitize and code the signals $s_n(t)$ to create bits of information $s_n(k)$. Signal coding may include spread-spectrum, error-correction, or encryption coding. Information bits $s_n(k)$ are represented as one form of the information signal $s_n(t)$. The bits $s_n(k)$ are provided to a modulator 104 which produces a plurality of modulated symbols.

The modulated symbols are coupled to a predistortion device 111, which adjusts signal parameters (such as power, gain-profile, and phase) in order to compensate for distortion resulting from network components (such as the channel, amplifiers, and receivers). The predistortion device 111 is an optional part of the transmitter 100. The modulated symbols may be processed in a carrier-signal generator 102, which may be a digital signal processor. The signal generator 102 performs an inverse Fourier Transform, and may perform other digital processing methods, such as filtering and pulse shaping. A low-pass filter 113 may filter the output of the signal generator 102. The modulated symbols may be mixed with a carrier signal from a local oscillator 203. The local oscillator 203 may be used to either up convert or down convert modulated carrier signals that are coupled into a communication channel by a coupler 150.

Figure 7:
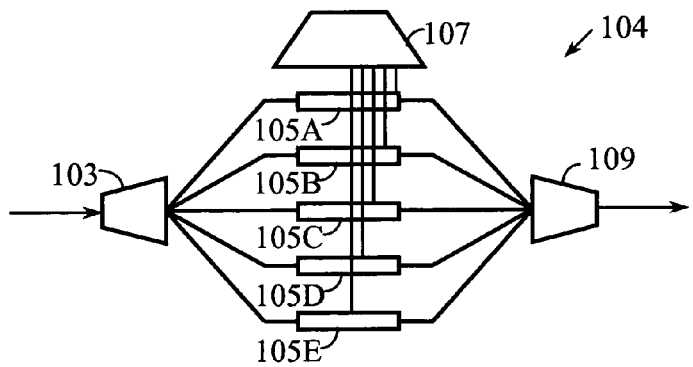
FIG. 7 is a diagram of a multicarrier modulator.

FIG. 7 shows a diagram of a multicarrier modulator 104 for use in an optical communication system. A frequency-diverse optical source (not shown) provides a frequency-diverse signal to a wavelength division multiplexer 103 that separates the frequency-diverse signal into a plurality of frequency components representing individual carrier signals. Each carrier is coupled through one of a plurality of carrier modulators 105A to 105E. Modulation signals are provided by a modulation signal generator 107 coupled to each of the carrier modulators 105A to 105E. The modulated carriers may be combined by a combiner 109 before being coupled into a communication channel (not shown).

A combiner, such as the combiner 109 is any device or process that has an input of a plurality of signals and an output representing a superposition of the signals. A combiner may be a physical device, such as a wavelength multiplexer, splitter, voltage divider, a summer, or a difference amplifier. A combiner may be a combining process performed by a computer processor. A combiner may provide phase shifts to one or more input signals, filtering, inversion, interleaving, de-interleaving, or amplitude adjustment prior to combining the input signals.

Any of the modulators 104 used in the invention may include a selective modulation unit, such as the modulator disclosed in U.S. Pat. No. 5,949,925 that operates on each carrier signal individually.

U.S. Pat. No. 5,796,765 (which is incorporated herein by reference) describes a mode-locked laser used to control an optical switch. The laser has an intracavity modulator that is repetitively modulated at an integer multiple of the cavity round-trip time. Output pulses are in bit positions that correspond to the signal input to the modulator. This method could be used to switch the transmission of a CIMA signal output to an optical fiber. This laser could also be used to generate the CIMA signals, and in the process control the timing of the CIMA signals. U.S. Pat. No. 5,812,302 discloses a high-speed frequency-modulation signal source.

Pulsed signals may be digital or analog modulated. The modulator 104 may be a Mach-Zender modulator made of lithium niobate ($LiNbO_3$). Lithium niobate external modulators are typically used to provide amplitude-shift key or phase-shift key modulation. Frequency-shift keying may be accomplished by modulating the drive current of a transmitter diode laser. The modulation may include multi-level keying formats.

Information modulated onto carriers may be coded, such as according to a multiple-access, error-correction, or encryption code. Interleaving may be employed to reduce distortion effects caused by the channel 99. The carriers may be phase-shift (or delay) coded or otherwise coded with a multiple-access or encryption code. Modulators may provide a modulation signal to each of the carriers, or they may modulate a composite transmit signal formed from the superposition of the carriers. The modulator 104 may include a clock having a frequency that determines the modulation frequency imparted to the data.

The modulator 104 may include a delay or phase-shift device that delays or phase shifts one or more of the carriers before insertion into the fiber. The delay may be applied by a timing switch or delay device that adds a delay or phase-shift to each of the carriers separately or combined. The delay device may consist of one or more delay paths that provides a variable delay to the carriers, such as a delay that depends on carrier wavelength or polarization. The modulator 104 may provide a windowing function to lower sidelobes. Windowing functions include spatially variant apodization and any other methods that reduce sidelobes, such as Hamming, Hanning, Gaussian, triangular (Bartlett), Kaiser, Chebyshev and raised-cosine filtering.

A modulation scheme, such as pulse amplitude modulation may be performed on the individual carriers or on the composite signal 130 shown in FIG. 3A. The modulation width may be large relative to the pulse width. For example, the modulation width may span a plurality of time intervals 133, 135, and 137. The modulation width may span a short time interval such as interval 135. In either case, the composite signal 130 received by a receiver (not shown) will be substantially identical. Therefore, a very large modulation width (i.e., a very slow modulation frequency) can be used to generate high-bandwidth modulated signals.

FIG. 3A shows a plurality of phase spaces 123, 125, 127, and 129. Phase space (which is described in PCT Appl. No. WO99/41871) is the phase relationship between different carriers. The zero-phase relationship 125 corresponds to a constructive interference signal (such as a pulse) positioned at a particular instant in time. This enables the composite signal 130 to be detectable by a receiver (not shown) that does not adjust the phase of the individual carrier signals. Non zero-phase relationships, such as phase spaces 123, 127, and 129, correspond to a substantially zero composite signal 130. Windowing at either or both the transmitter 100 and the receiver 200 may reduce the sidelobes of the composite signal 130.

Although the composite signal 130 may have substantially zero amplitude in time intervals where there is a non zero-phase relationship between the carriers, the carriers still exist and therefore, the information signal represented by the constructive interference that occurs at zero phase exists in non zero phase. Recovery of the information signal from a non zero-phase sampling of the carriers (such as may be required due to chromatic dispersion in the propagation channel) may be achieved by phase shifting (or delaying) the carrier signals in order to construct a zero-phase relationship.

In a wireless channel, the redundantly modulated multicarrier protocols provide substantial improvements in performance over all other protocols. CIMA provides superior bandwidth efficiency compared to any other protocol, and it allows a seamless conversion from orthogonal coding to quasi-orthogonal coding. CIMA provides substantial improvements to interference rejection and signal degradation due to multipath. Frequency diversity in CIMA reduces transmission-power and power-control requirements. CIMA enables simplified transmitter and receiver designs, and it enables the implementation of ultra-wideband CDMA by using parallel processing. The implementation of redundantly modulated multicarrier protocols in antenna arrays introduces new array-processing capabilities. Frequency diversity in redundantly modulated protocols introduces new types of spatial processing that do not require antenna arrays.

The CIMA protocol also enables a seamless transition from orthogonal operating conditions to quasi-orthogonal operating conditions. A detailed discussion of the operation of a basic CIMA system is described in "Introduction of Carrier Interference to Spread Spectrum Multiple Access," Nassar et. al. (Proceedings of the 1999 IEEE Emerging Technologies Symposium on Wireless Communications and Systems, Apr. 12–13, 1999), which is hereby incorporated by reference.

Time-division multiple access may be achieved by assigning one or more time intervals to each transmitter. A transmission system may include at least two transmitters generating modulated multicarrier signals offset in time. Another type of multiple access may be achieved by assigning one or more time-dependent phase spaces to each transmitter. The phase spaces may be sampled in multi-user detection processes or in other processes that can enhance the signal quality of received signals. Multiple access may be achieved by generating and processing spread-spectrum signals (such as CDMA) produced by setting or adjusting (such as weighting or hopping) characteristics of multicarrier signals. In another form of multiple access, coded multicarrier signals are processed in the frequency domain using a multi-user type of processing, such as cancellation or constellation methods for separating interfering information signals.

One aspect of the present invention includes the use of a redundantly modulated multicarrier protocol in waveguides. An optical-fiber communication system that uses the multicarrier protocol is illustrated in FIG. 1. Single-mode fibers are typically used in optical communication systems because of their high-bandwidth capabilities. Optical fibers described herein may be any type of optical-fiber waveguide including (but not limited to) single mode, multimode, step-index, and quadratic-index fibers.

An optical-fiber path may include at least one amplifier to compensate for fiber attenuation and component loss. Either equalization or pre-emphasis may be used in the optical system to compensate for non-uniform amplifier gain. U.S. Pat. No. 5,847,862 (which is incorporated by reference) describes a method of shaping amplifier outputs to offset depletion of high-frequency channels.

In an optical fiber (or any type of waveguide), differences in carrier velocity may result from dispersion. Dispersion includes intramodal (group velocity) dispersion, such as material and waveguide dispersion, and intermodal dispersion, such as modal dispersion. In the preferred embodiments, it is assumed that the optical fiber has a dispersion that increases with increasing signal wavelength.

Figure 8:
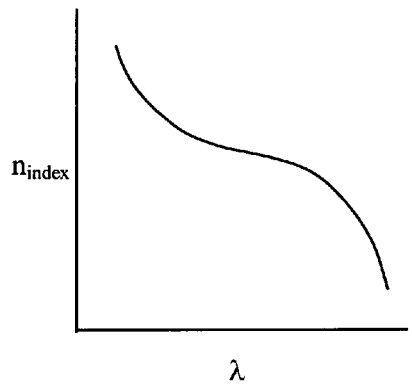
FIG. 8 is a plot of index of refraction $n_{index}$ with respect to signal wavelength $\lambda$ in an optical fiber.

FIG. 8 shows a variation in index of refraction $n_{index}$ with respect to signal wavelength $\lambda$ in an optical fiber. The variation of $n_{index}$ with respect to $\lambda$ results in dispersion of broadband signals propagating in the fiber. A dispersion profile is a dispersion-versus-wavelength (or frequency) relationship of a dispersive medium.

Figure 9:
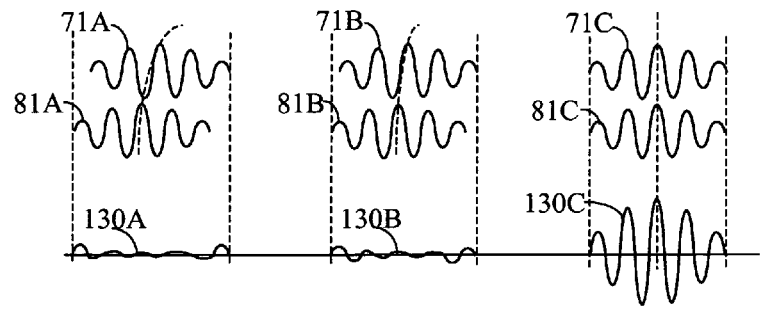
FIG. 9 is a plot of relative positions of two waves having different wavelengths at different locations in a dispersive medium.

FIG. 9 shows the relative position of two waves of a plurality of waves coupled into a dispersive waveguide 99. Two waves 71A and 81A are coupled into the waveguide with a time offset. Wave 81A has a longer wavelength than wave 71A and therefore travels faster through the waveguide 99. The waves 71A and 81A (as well as other waves in the group) are substantially out of phase, resulting in a composite signal 130A having a nearly zero amplitude. As the waves 71A and 81A travel through the waveguide, the longer-wavelength wave 81A travels faster than wave 71A. At another location in the waveguide 99, waves 71B and 81B are closer with respect to time than waves 71A and 81A. The waves 71B and 81B are still substantially out of phase, resulting in a nearly undetectable composite signal 130B. However, the composite signal 130B has a shorter time duration than signal 130A.

At another location in the waveguide 99, dispersion causes a group of different-frequency waves 71C and 81C to be in phase. The composite signal 130C resulting from the superposition of the waves 71C and 81C includes a constructive-interference pulse that is easily detectable. The duration of the composite signal 130C is shorter than the duration of the other composite signals 130B and 130A. The duration of the detectable portion of signal 130C may be substantially shorter than the actual duration of the signal 130C.

Dispersion will cause the waves 71C and 81C to move out of phase at other locations past the location where the waves 71C and 81C combine in phase. Matching dispersion profiles and phase relationships enables signals to be enhanced by dispersion. As matched signal components travel through a waveguide, the duration of composite signals is reduced and the detectability of the composite signals is increased. The duration and detectability of a composite signal may be optimized at one or more locations along a waveguide.

A phase relationship applied to a multicarrier (or frequency-diverse) signal matches a dispersion profile of a waveguide for a specific distance if the carriers have a predetermined phase relationship after traveling that distance through the waveguide. The predetermined phase relationship at the specific distance along the waveguide may be a zero-phase or a non zero-phase relationship.

A virtual address is the phase relationship of a transmitted multicarrier (or frequency-diverse) signal required to produce a predetermined phase relationship at a predetermined receiver along a waveguide. A virtual address may be represented as one or more phase spaces, such as the phase spaces 123, 125, 127, and 129 shown in FIG. 3A. A transmitter applies the virtual address to the multicarrier signal. The characteristics of the address depend on the waveguide dispersion, the length of the waveguide between the transmitter and the receiver(s), and the characteristics of the predetermined phase relationship of the signal(s) required at the receiver(s).

Virtual switching includes a process of addressing a transmitted signal such that it has a predetermined phase relationship upon reception by at least one receiver. The addressing is a type of dispersion compensation. The phase relationship of the addressed signals is selected such that as the signals propagate through the waveguide and distort due to dispersion, the phase relationships mutate to create a predetermined phase relationship at a specific receiver location along the waveguide. At other locations along the waveguide, the signals may have phase relationships that cause them to be disregarded or undetected by receivers at those locations.

Figure 10:
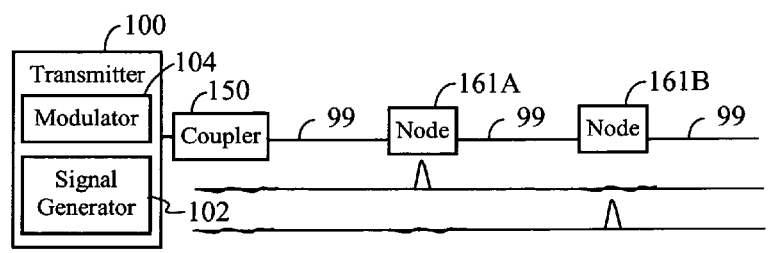
FIG. 10 is a diagram that illustrates a process of addressing signals in a dispersive medium by showing the pulse widths and pulse heights of signals having different addresses.

FIG. 10 illustrates the process of addressing. A transmitter 100 couples addressed multicarrier transmission signals into a waveguide 99 that has at least two nodes 161A and 161B. The nodes 161A and 161B, which are at different locations along the waveguide 99, may include couplers (not shown) to receivers (not shown) or other communication channels (not shown). The transmitter 100 includes a modulator 104, a multicarrier-signal generator 102, and a coupler 150 that couples modulated multicarrier signals to the waveguide 99.

The transmitter 100 may include an address applicator (not shown) or the modulator 104 may perform address application to the transmission signals. The address applicator (not shown) selects at least one relative phase relationship between a plurality of carrier signals having different values of at least one orthogonalizing property (such as frequency). The relative phase relationship corresponds to at least one address. The address applicator (not shown) produces at least one packet of carriers having the relative phase relationship(s). Transmission signals having at least one virtual address arrive at one or more predetermined nodes (such as nodes 161A and 161B) with at least one predetermined phase relationship.

The address applicator (not shown) may use a relative phase selector (not shown) to match a virtual address to a transmission signal based on its intended destination(s). The address applicator (not shown) may include a packet generator (not shown) to produce a PAM section of a multicarrier signal having a desired phase relationship.

In the addressing process shown in FIG. 10, the transmission signals addressed to the first node 161A arrive at the first node 161A with a predetermined phase relationship that facilitates reception of the transmission signals. For example, the transmission signals may have a zero-phase relationship at node 161A. However, at node 161B, the signals addressed to node 161A are undetectable (e.g., they have non-zero phase if there is a zero phase space detector at node 161B) or have a phase relationship that causes them to be discarded. Similarly, transmission signals addressed to the second node 161B arrive at that node 161B with a predetermined phase relationship and are undetected or removed at node 161A.

Figure 11A:
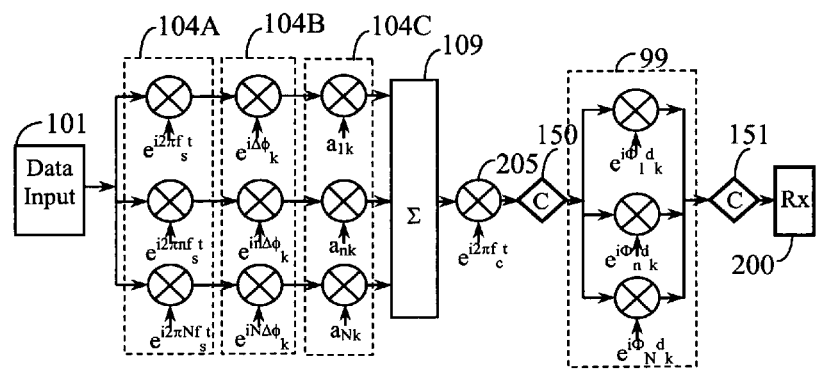
FIG. 11A is a schematic of a multicarrier transmission system that provides addressing to transmitted signals.

FIG. 11A shows a multicarrier transmission system that provides addressing to transmitted signals. An information signal $s_k(t)$ (from an input data source 101) intended for a $k^{th}$ user is split and modulated onto N carriers in a first modulation step 104A. In a second modulation step 104B, a plurality of complex weights is applied to the modulated carriers. The complex weights include phase shifts (or delays). In an addressing step 104C additional weights $a_{nk}$ are applied to the carriers to compensate for carrier-dependent distortion effects caused by the channel 99 between the transmission system and an intended receiver 200.

In this case the channel provides a distortion to the $n^{th}$ carrier by an amount of $e^{i\Phi_n d_k}$. $\Phi_n$ is a linear (with respect to distance) delay factor associated with a carrier frequency in the channel 99 and $d_k$ is the distance that the wave travels between the transmitter and the receiver 200. The factor $\Phi_n$ may depend on nonlinear channel effects, such as dispersion.

The weights $a_{nk}$ have values of $e^{i\Phi_n d_k}$ to compensate for the channel distortion affecting each carrier. Therefore the weights $a_{nk}$ provide a type of addressing to the transmitted signals. The weights $a_{nk}$ may include windowing weights and/or weight values that facilitate signal separation by the receiver 200. The modulation steps 104A, 104B, and 104C may be performed in any order and may be combined. The transmitted signals are coupled out of the channel 99 by a receiver coupler 151 coupled to the receiver 200.

Figure 11B:
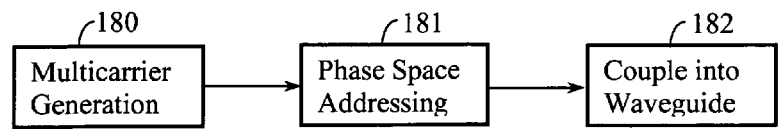
FIG. 11B is a flow diagram of an addressing method for addressing signals in a dispersive medium.

FIG. 11B shows steps of an addressing method. Multicarrier signals are produced in a multicarrier-signal generation step 180. The multicarrier signals may be information modulated during this step 180. In the multicarrier-signal generation step 180, the multicarrier signals are preferably provided with a carrier-phase relationship that matches the dispersion profile of the channel 99 for at least one desired address. The process of providing the carrier-phase relationship may include providing at least one initial carrier-phase relationship between the carriers and selecting the values of at least one carrier's orthogonalizing properties (such as frequency and/or polarization) that affect dispersion of the signals in the channel 99.

The multicarrier signals are assigned at least one address in a phase-space addressing step 181. Adjustments to the carrier phases and/or the carrier frequencies may be performed in this step 181. The process of addressing is performed by selecting at least one set of relative phases of the multicarrier signals. The selection process may be performed by individually modulating a portion of each carrier or modulating a portion of the composite signal 130. The modulation may be any type of modulation including PAM, and it may involve modulating the carriers or composite signal 130 with at least one information signal. The phase-space addressing step 181 may adjust or control the carrier phases and/or the orthogonalizing properties. A coupling step 182 couples the addressed signals into the channel 99.

Adjusting multicarrier signal frequencies may be performed at the transmitter 100 in order to provide a phase relationship that matches a dispersion profile of the waveguide 99. This is done in order to provide a specific phase relationship between the carriers at the transmitter 100 (such as to facilitate PAM of the superposition signal). The signal frequencies may also be adjusted in order to adjust the phase relationship of signals received by one or more receivers (not shown) along the waveguide 99. If the multicarrier signals are non-uniformly spaced, then dispersion shifting of the carriers is unlikely to generate multiple primary-interference zones associated with a single address.

Receivers described in this specification are considered to be any system that processes transmitted signals coupled out of (received from) a communication channel. The processing achieves recovery of one or more information signals modulated on the transmitted signals. The receiver 200 may include a coupler to couple signals from the communication channel 99. The receiver 200 may provide decoding of encrypted, error-coded, or spread-spectrum coded signals. Signal processing may involve use of a phase-lock loop to track phases of received signals in order to compensate for phase variations (such as jitter).

The receiver 200 may use discreet components or digital signal processing methods in a CPU. The receiver 200 may include one or more discreet components or methods including envelope detectors, filters, decoders, level controllers, amplifiers, phase-lock loops, de-interleavers, demodulators, mixers, windows (such as frequency-domain or time-domain windows), analog-to-digital converters, circulators, samplers, phase shifters, weight-and-sum processors, delay lines, pulse-stretching processors, electrical signal generators, signal storage processors, cancellers, and frequency converters. The receiver 200 may change the frequency of received signals before, during, or after processing to recover the information signal(s). The receiver 200 may convert received signals into electrical signals and the electrical signals may be processed in a CPU using analog or digital signal processing.

A time-domain receiver receives and processes transmitted time-domain signals to recover one or more information signals modulated on the transmitted signals. The time-domain receiver may receive a time-domain signal and apply a signal-processing method to facilitate reception of a pulse. Many types of signal processing may be used to stretch a received pulse. RF pulse-stretching methods are described in U.S. Pat. No. 5,805,317, which is hereby incorporated by reference. Time-domain receivers may include envelope detectors, peak detectors, and the like. Time-domain receivers may also include any type of decimation-in-frequency system, frequency analyzer, or frequency processor to assist in detection of the received time-domain signals.

Figure 12:
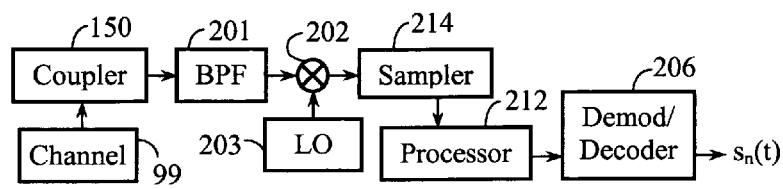
FIG. 12 shows a general form of a multicarrier receiver.

FIG. 12 shows a general form of a receiver 200 of the invention. FIG. 12 illustrates the function and structure of a signal processor that extracts information signals from one or more received multicarrier signals. Some of the processes performed by the receiver 200 may be performed by software in a computer or digital signal-processor chip.

A coupler 150 couples received signals from a communication channel 99 into a carrier isolator 201, such as a band-pass filter. A band-pass filter may include one or more filters of a filter bank (not shown). The isolated received signals may be down converted by mixing with a local oscillator 203 signal. Down conversion of the received signals is an optional process. The received signals may be sampled by a sampler 214 to produce a plurality of received information bits (or otherwise processed signals) that are processed in a processor 212. Processed signals are passed on to a demodulator/decoder 206 that outputs a recovered information signal $s_n(t)$.

The carrier isolator 201 separates or isolates at least one multicarrier signal. The carrier isolator 201 may provide filtering, diffraction, or coding (or a combination of methods) to achieve separation of multicarrier signals. The carrier isolator 201 may include a filter bank (not shown), which is defined as any device that separates multicarrier signals with respect to one or more orthogonality parameters that distinguish the multicarrier signals.

One type of filter bank is a frequency-filter bank. A frequency-filter bank is any device or method that performs separation-by-frequency of a frequency-diverse signal. A filter bank may be an array of filters or a signal-processing technique (such as a Fourier transform) that acts on a time-domain signal to separate it into spectral components. A filter bank may include a set of processors that spectrally decompose a time-domain signal into a set of frequency bins. A frequency bin represents the frequency band of each filter in a filter bank. The filter bank may provide weights to the bins.

A Fourier transform, as used herein is defined as any of the direct or inverse Fourier transform methods including Fourier transforms, Fourier series, discreet-time Fourier transforms, discreet Fourier transforms, and polynomial transforms. Fourier transforms may be implemented using any number of computational techniques, such as fast Fourier transforms, and they may be supported using additional mathematical relationships such as Laplace transforms.

A wavelength demultiplexer is a type of carrier isolator 201. Many different types of filters may be used in a carrier isolator 201. To separate individual carriers, the filters preferably have sharp roll-off characteristics to minimize cross talk between channels. The carrier isolator 201 may include wide-band filters for separating a plurality of channels into groups of channels for FDM. The carrier isolator 201 may also include multiple stages of wavelength demultiplexers.

A preferred embodiment of the carrier isolator 201 includes a monolithic optical-waveguide filter. Bandpass filters may be interferometric (such as thin-film interference filters), resonant cavities, or acousto-optic filters. A filter may comprise a Bragg grating in a Mach-Zehnder interferometer. Filters may be switchable or tunable. Another method of carrier isolation may include filtering after converting received electromagnetic signals to electrical signals. A star coupler with tunable filters on the receiving ends may also be used as a carrier isolator 201 for wavelength demultiplexing signals.

Another type of carrier isolator 201 is a decoder, which may be implemented in the demodulator/decoder 206 or in other decoders described in the specification. A decoder may be used to describe either or both an information decoder and a carrier decoder. The decoder may be a multi-stage or parallel decoder and may include at least one correlator and/or at least one matched filter.

An information decoder decodes an encoded information signal. The decoder may provide encryption, error-correction, or spread-spectrum decoding (or any combination of decoding) to decode an encoded information signal.

A carrier decoder provides decoding of an encoded multicarrier signal in which each carrier signal may be AM, FM, ASK, PSK, frequency-hop, time-hop, delay, time-offset, or phase-space encoded. Encoding may include differential modulation.

A spread-spectrum decoder can be used as an information decoder or carrier decoder. The decoder may decode an information or multicarrier signal according to a code sequence generated by a code generator. The decoder may include a multi-stage decoder. Decoders may generate one or more N-point transforms. N-point transforms include DFTs, FFTs, WTs, HTs, RTs, PTs, Inverse DFTs, Inverse FFTs, Inverse WTs, Inverse HTs, Inverse RTs, Inverse PTs, and any other reversible transform.

The sampler 214 may sample received signals with respect to one or more orthogonality parameters. A time-domain sampler collects samples during multiple time intervals. A phase-domain sampler takes at least one sample in at least one time interval, then adjusts the relative phases of the sampled signals to reconstruct time-domain signals occurring in other time intervals. A space-domain sampler receives samples from a plurality of spatially separated locations or directions of arrival. A polarization sampler takes samples from a plurality of samplers having different polarization sensitivities. A frequency-domain sampler includes a filter bank for separating received signals into a plurality of frequency components. The information signals are removed from the carriers and the complex-valued amplitude of the information signals is preserved. Frequency-domain processing may include the removal of redundant transform values. A sampler (such as sampler 214) may be used as a carrier isolator.

The processor 212 may include one or more discreet components or signal-processing methods including envelope detectors, filters, decoders, coders, level controllers, amplifiers, phase-lock loops, de-interleavers, demodulators, mixers, windows (such as frequency-domain and time-domain windows), analog-to-digital converters, digital-to-analog converters, circulators, samplers, phase shifters, weight-and-sum processors, delay lines, pulse-stretching processors, signal generators, local oscillators, signal-storage processors, cancellers, and frequency converters.

Components of the receiver 200 shown in FIG. 12 may be arranged in different orders. In some cases, some of the components can be removed. For example, in its simplest form, the receiver 200 may include the coupler 150 coupled to the processor 212 wherein the processor 212 includes an envelope detector that outputs the information signals $s_n(t)$.

Figure 13:
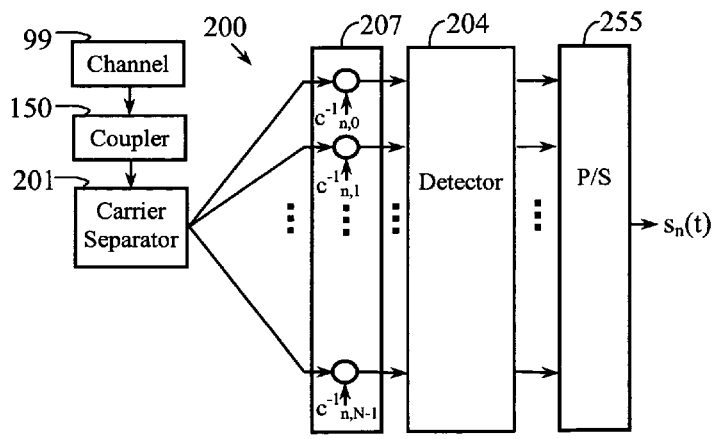
FIG. 13 is a functional diagram of a receiver and reception method.

FIG. 13 shows a receiver 200 and reception method of the invention. A coupler 150 couples received multicarrier signals from a communication channel 99 to a carrier isolator 201. The carrier isolator 201 separates a plurality of the multicarrier signals into separate carrier-signal components. The carrier-signal components are coupled into a decoder 207 that decodes either or both carrier and information signals. The decoded signals are coupled to a detector 204, which may include a parallel-to-serial signal converter 255. The signal converter 255 may include at least one weight-and-sum processor, a combiner, a canceller, and/or a constellation processor. The signal converter 255 outputs one or more recovered information signals $s_n(t)$.

The detector 204 may include a multi-user detector (not shown). A multi-user detector (not shown) receives one or more signals from a plurality of user channels and processes those signals to estimate their values. The detector 204 can make either hard decisions or soft decisions. The detector 204 may perform diversity combining, which can consist of co-phasing, selective combining, maximal-ratio combining, equal-gain combining, maximal-selection combining, or any other type of diversity combining.

Any of the signal-processing operations associated with the processor 212 may be incorporated into the carrier isolator 201, the decoder 207, the detector 204, or the parallel-to-serial signal converter 255. The decoder 207, detector 204, and parallel-to-serial signal converter 255 may comprise one of a plurality of sets of receivers coupled to the carrier isolator 201. The carrier isolator 201 may separate received multicarrier signals into a plurality of groups. Each of the carrier groups may be coupled to a different receiver, such as receiver 200.

There are a large variety of receivers that can be used in a redundantly modulated multicarrier waveguide-communication system including the following:
1. An ordinary time-domain receiver that receives carriers having a zero-phase relationship.
2. A receiver coupled to a transmitter that retransmits the received signals into the same channel medium.
3. A transport-medium interface: (such as an optical-to-RF converter) for retransmitting received signals into a different channel.
4. An optical-to-electrical converter (which may include a digital signal processor for processing electrical signals) and/or detector.
5. A multi-user detector or multi-channel detector.
6. An address adjuster that uses phase-domain sampling to produce a predefined phase relationship between multicarrier signals. The address adjuster may apply phase adjustments to compensate for non zero phase space signals.

Combinations of these receiver designs may be used in any waveguide or wireless receiver.

Figure 14A:
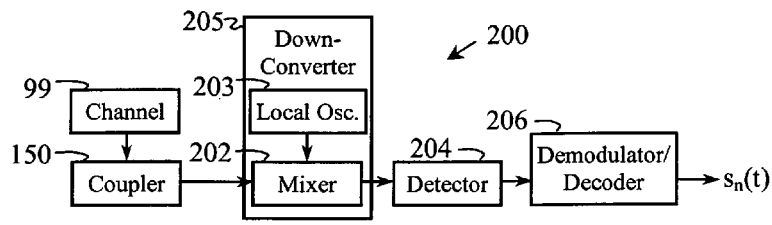
FIG. 14A is a diagram of a receiver for an optical system.

A receiver for an optical system, such as an optical-fiber communication system, is shown in FIG. 14A. A coupler 150 couples signals from a communication channel 99 (such as an optical fiber or free space) into an optical receiver 200. Couplers (such as coupler 150) may include one or more signal-processing systems (not shown) for filtering, shaping, or otherwise processing received signals before detection. Received signals may optionally be down converted by a down converter 205. A down converter, such as the down converter 205, may be a heterodyne or a homodyne device. The down converter 205 includes at least one local oscillator 203 and at least one mixer 202 for mixing one or more reference signals (generated by the local oscillator 203) with at least one of the signals received from the channel 99 to generate one or more down-converted signals.

A detector 204 may receive signals directly coupled from the communication channel 99. The detector 204 may receive down-converted signals from the down converter 205. In an optical version of the detector 204, optical signals are converted to electrical signals by one or more photodetectors having high quantum efficiency in the relevant spectral range of the received or down converted signals. The detector 204 may be an electrical or RF detector that is responsive to baseband or intermediate-frequency signals output from the down converter 205. Detectors (such as the detector 204) may include signal processing systems (not shown), such as phase-lock loops, digital signal processors, filters, phase-shifters, amplitude adjusters, multi-user detectors, feedback loops, synchronizers, pilot-signal processors, combiners, and the like. Signals output from the detector 204 may optionally be demodulated and/or decoded by a demodulator/decoder 206.

A detector of the present invention for a multicarrier optical-fiber system may have one of the following designs:
1. A single photodetector sensitive to all received wavelengths.
2. A wavelength demultiplexer to separate wavelengths, a received-carrier adjuster (phase or amplitude), and a photodetector.
3. A wavelength demultiplexer and a plurality of photodetectors. Electrical outputs of the photodetectors may be processed and combined.

Figure 14B:
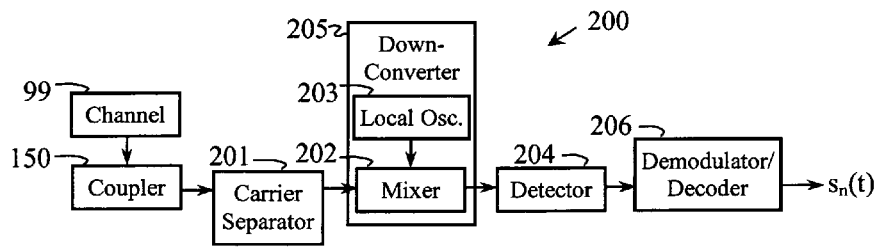
FIG. 14B is a schematic for an optical receiver.

FIG. 14B shows a coupler 150 for coupling signals from a communication channel 99 to a carrier separator 201 (such as a wavelength demultiplexer). The carrier separator 201 separates received signals into a plurality of carrier-signal components that are coupled to at least one receiver, such as receiver 200. A carrier separator (such as the carrier separator 201) may separate the received signals into separate carrier signals or groups of carrier signals. A down converter 205 may optionally down convert the signal components. Similarly, an up converter (not shown) may up convert received signals or signal components. Signal up conversion or down conversion may optionally be performed before carrier separation.

The down converter 205 includes a local oscillator 203 and a combiner 202. A detector 204 receives the carrier signals (which may be down-converted or up-converted carrier signals). The detected signals may be subjected to further processing by a demodulator/decoder 206 that performs either or both demodulation and decoding of the detected signals.

Demultiplexing systems (as well as multiplexers) may include diffraction gratings and multi-layer interference filters. Mach-Zender or Fabry-Perot interferometers may be used for filtering the desired channel. The demodulator/decoder 206 may include a square-law demodulator to demodulate received ASK signals. The receiver 200 may include a phase-diversity receiver.

Figure 14C:
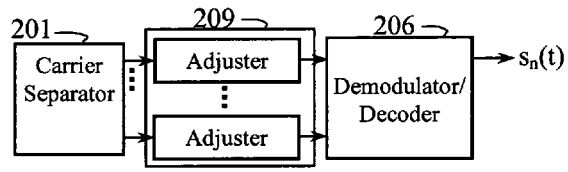
FIG. 14C is a diagram of a receiver having a signal-component adjuster

FIG. 14C shows a receiver 200 having a signal-component adjuster 209. Received electromagnetic or electrical signals are coupled into a carrier separator 201, which separates the received signals into individual carrier signals or groups of carriers. The carriers are coupled to the component adjuster 209 that may adjust carrier-signal parameters (such as magnitude, phase, frequency, polarization, and code). The adjusted carriers are coupled into a demodulator/decoder 206 that may provide preprocessing (including combining) before being demodulated and or decoded.

Figure 14D:
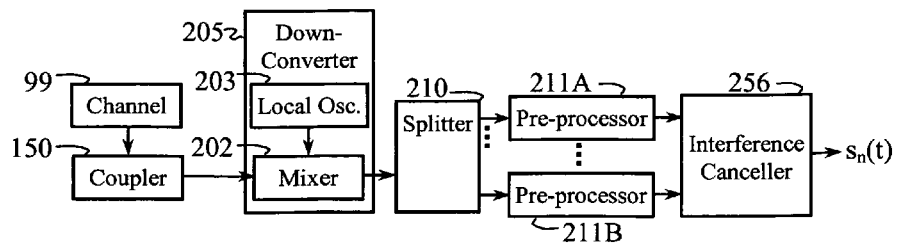
FIG. 14D is a diagram of a multi-channel receiver.

FIG. 14D shows a multi-channel (or multi-user) receiver 200 coupled to a communication channel 99. Received signals are coupled into the receiver 200 by a coupler 150. A coupler (such as coupler 150) may include more than one coupling device coupled to a communication channel 99. Received signals may optionally be down converted by a down converter 205. A splitter 210 splits down-converted or directly coupled signals. The splitter 210 may be a carrier separator (not shown) or the splitter 210 may produce multiple versions of the received signals by duplicating, sampling, or splitting the received signals. The split signals are coupled into a plurality of preprocessors, such as preprocessors 211A and 211B.

The receiver 200 may receive multiple transmissions from at least one transmitter. The received signals are preferably separable through a multiple-access technique based on at least one diversity parameter, such as spread-spectrum code, frequency, time, differential power, polarization, or phase space.

The preprocessors 211A and 211B may include an address separator to demultiplex received signals with respect to at least one diversity parameter. If at least one of the diversity parameters is phase space, the preprocessors 211A and 211B may include one or more phase processors (not shown) for decoding multicarrier signals having different phase-spaces. A phase processor (not shown) applies phase adjustments to a plurality of carrier signals to provide at least one predetermined phase relation. A phase processor (not shown) may include a plurality of phase processors (not shown) for applying a plurality of phase adjustments to compensate for a plurality of different phase relationships. The preprocessors 211A and 211B may provide other digital signal processing techniques to the signals, such as filtering, phase adjustment, phase stabilization, amplitude adjustment, and decoding.

The separated signals may be demodulated and/or decoded. Interference in the signals may be removed by an optional interference canceller 256. The receiver 200 may include at least one phase-locked loop.

Figure 14E:
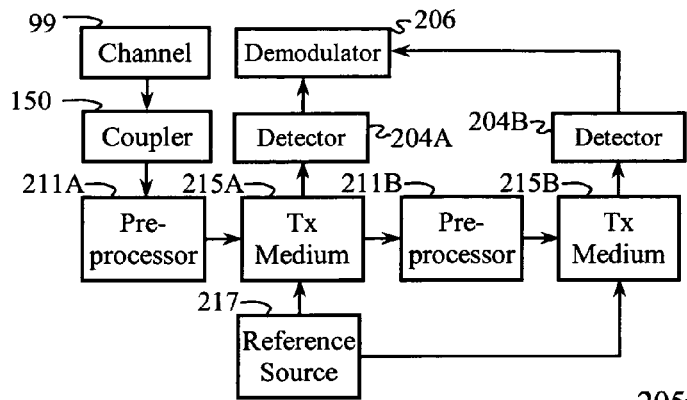
FIG. 14E is a schematic of a receiver that performs address separation.

An alternative embodiment of a receiver 200 that performs address separation is shown in FIG. 14E. A coupler 150 couples optical carrier signals from a communication channel 99 into a first preprocessor 211A that applies phase adjustments to a plurality of the carrier signals. Outputs from the preprocessor 211A are coupled into a nonlinear transmission medium (e.g., a KDP crystal) 215A. The transmission medium 215A is coupled to a second preprocessor 211B that applies phase adjustments to a plurality of the carrier signals. Outputs from the preprocessor 211B are coupled into a second nonlinear transmission medium 215B. Additional preprocessor/transmission-medium systems may be arranged in series.

A reference source 217 produces a plurality of reference beams that are coupled into each nonlinear transmission medium 215A to 215B. A nonlinear process (such as second-harmonic generation) may be used to generate an information signal resulting from the interaction of the multicarrier signals and the reference beams. Other techniques for generating an information signal may be used instead, such as a threshold-power detection technique in which signals output from the preprocessors may excite a gain medium if the carriers are in phase. A detector, such as detectors 204A and 204B receives each of the information signals. The detected signals may be demodulated, decoded, and/or acted upon by an interference canceller (not shown).

Figure 15:
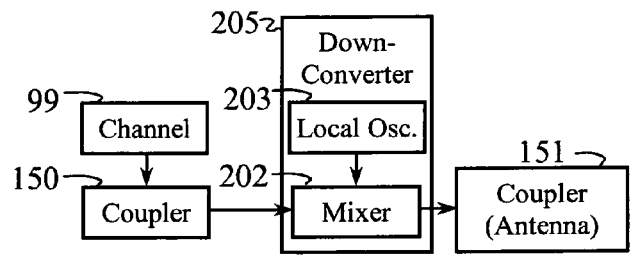
FIG. 15 is a diagram of a transport-medium interface that couples received optical signals from an optical waveguide to a free-space propagation environment.

FIG. 15 shows a transport-medium interface that couples received optical signals from an optical waveguide 99A to a free-space propagation environment 99B. A first coupler 150 couples optical signals out of the waveguide 99A. The optical signals are optionally down converted by a down converter 205. The down converter 205 may provide a plurality of mixing signals to the optical signals. The optical signals may be separated according to one or more diversity parameters (such as wavelength) before being down converted. Down conversion may include reducing the frequency separation of the optical signals. The down-converted signals are coupled into the free-space propagation environment 99B by a second coupler 151. The coupler 151 may be an antenna system (not shown) including a single antenna element or an array of antennas. The coupler 151 may include at least one processor (not shown) to control beam forming and directionality.

The down converter 205 may include any type of optical-to-RF converter (not shown). An optical-to-RF converter is a device or method that down converts an electromagnetic signal to a signal having a lower frequency. This includes mixers, optical-heterodyne, and optical-homodyne devices. The down converter 205 may include a homodyne device if the optical carriers are modulated with RF signals. The down converter 205 may be any device that has an input of at least one information signal modulated on at least one optical carrier and that outputs at least one RF carrier that is modulated with the information signal(s). The down converter 205 may perform an intermediate process of converting an input electromagnetic signal into an electrical signal, which can be used to modulate one or more RF output signals. A processor (not shown) may perform one or more signal processing steps on an input signal, such as filtering, amplifying, windowing, phase shifting, encoding, decoding, storing, duplicating, inverting, and weighting.

Redundantly modulated multicarrier signals may be used as a multiple-access communication protocol such as CIMA, MC-CDMA, or an OFDM protocol that transmits data over multiple carriers. CIMA signals have advantageous transmission characteristics in a wireless environment. CIMA signals can be used to construct many different wireless protocols including GSM, other TDMA protocols, and CDMA. CIMA provides substantial improvements to system capacity, simplicity, and signal quality, and it greatly increases diversity benefits of conventional multiple-access protocols. CIMA also enables a simple transport-medium interface between optical-fiber and wireless transmissions because a wireless protocol constructed from multiple carriers does not require a protocol change at the interface.

The transport-medium interface may be designed to couple received signals from the free-space channel 99B to the waveguide 99A. The transport-medium interface may include a RF-to-optical converter (not shown) for converting received wireless RF signals into optical signals that are inserted into the waveguide 99A.

Figure 16:
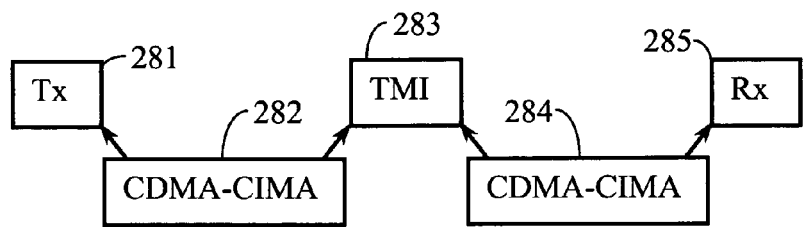
FIG. 16 is a flow diagram for a process of transmitting signals that transition between a waveguide and a wireless channel without requiring a change in protocol.

FIG. 16 outlines a process of transmitting signals that transition between a waveguide and a wireless channel without requiring a change in protocol. A transmission step 281 involves transmitting at least one CDMA-type CIMA signal into an optical waveguide. A waveguide-propagation step 282 provides propagation of the transmitted signal(s) through the waveguide. Signals are coupled out of the waveguide and into a wireless channel in a transport-medium interface step 283. This step 283 may involve changing the wavelength of the signals by a frequency-conversion method, such as optical-heterodyne or optical-homodyne processes. A free-space propagation step 284 describes the propagation of the signals coupled into the wireless channel. The free-space propagating signals are received in a wireless-signal reception step 285.

Figure 17A:
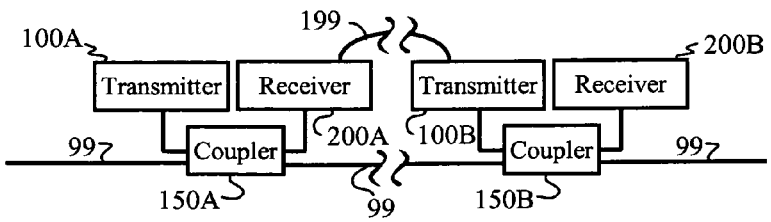
FIG. 17A is a schematic of a waveguide communication system that includes a cancellation line to cancel signals received at a desired receiver.

FIG. 17A shows a waveguide communication system that includes a cancellation line 199 to cancel signals received at a desired receiver 200A after they propagate past the receiver 200A. A first node 150A receives a desired signal from a waveguide-communication channel 99. The node 150A includes a transmitter 100A and the receiver 200A. The signal received at node 150A continues to propagate through the channel 99 to other nodes, such as a node 150B. Node 150B includes a transmitter 100B and a receiver 200B.

If the signal is a multicarrier signal having a phase relationship that matches the phase profile of the waveguide 99, then the signal may be undetectable at node 150B. However, if the carriers are uniformly spaced in frequency, then a detectable constructive-interference signal will be detectable at more than one location in the waveguide 99. The carrier signals may have a mode relationship that causes a plurality of detectable constructive-interference signals to occur at multiple locations in the waveguide 99.

At least one cancellation channel 199 is coupled between node 150A and 150B. The cancellation channel 199 couples the receiver 200A to the transmitter 100B. A desired signal received at node 150A may be coupled from the receiver 200A to the transmitter 100B. Thus, node 150B receives two versions of node 150A's desired signal. One version is the wave that propagates through the communication channel 99 to provide a channel-shifted version of node 150A's desired signal. The second version is received from the cancellation channel 199 and inserted into the node 150B by the transmitter 100B. Preferably, the second version is a cancellation signal that is an inverse or out-of-phase replica of the channel-shifted version. Canceling node 150A's desired signal at a later stage in the waveguide 99 network enables reuse of node 150A's address space in other parts of the network.

The cancellation channel 199 may be a waveguide or wireless channel. A received signal at node 150A may be inverted or otherwise adjusted by either the receiver 200A or the transmitter 100B. The channel 199 may also provide signal processing (such as phase adjustment that naturally results from dispersion in a nonlinear medium). The channel paths of both the communication channel 99 and the cancellation channel 199 may each be oriented to provide an equal amount of delay to the signals received by receiver 200A.

The cancellation-channel 199 may include a separate waveguide or it may include a wireless channel. The cancellation channel 199 may be represented by one or more signals that have higher velocities than the signal(s) in the communication channel 99. The cancellation-channel 199 may consist of signals having a predetermined polarization, mode, and/or wavelength. Although not shown, one or more cancellation channels may connect nodes 150A and 150B to other nodes (not shown).

Figure 17B:
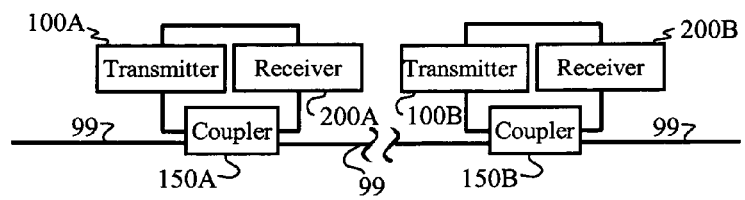
FIG. 17B is a diagram of an alternate embodiment of a waveguide communication system that cancels signals after a desired receiver receives them.

FIG. 17B shows a waveguide communication system that cancels signals received at a desired receiver 200A after they propagate past the receiver 200A. The communication system shown in FIG. 17B has similar components to the system shown in FIG. 17A except that each receiver-transmitter pair at each node 150A and 150B has a receiver-transmitter coupling, and the cancellation channel 199 (shown in FIG. 17A) is replaced by a virtual cancellation channel (not shown). The virtual channel is defined by a signal path of a cancellation signal inserted into the communication channel 99. The cancellation signal has at least one different signal characteristic (such as polarization, mode, or wavelength) that enables it to propagate faster than the desired communication signal received by receiver 200A.

The receiver 200A receives the desired signal and processes it to create a cancellation signal having at least one different signal characteristic (such as polarization, mode, or wavelength). Other processing steps (such as, but not limited to, phase shifting, delay, amplitude adjustment, and filtering) may be performed by the receiver 200A and/or the transmitter 10A. The transmitter 100A transmits the cancellation signal into the channel 99. The cancellation signal may be coupled into the channel 99 at a different node than node 150A.

The receiver 200B preferably receives the cancellation signal before it receives receiver 200A's desired signal. The cancellation signal is processed by either or both the receiver 200B and the transmitter 100B to ensure that the cancellation signal will cancel receiver 200A's desired signal. This processing may include steps to return the cancellation signal to the same frequency, mode, and/or polarization as receiver 200A's desired signal received at the node 150B or any other node (not shown) where the cancellation signal may be inserted.

Figure 17C:
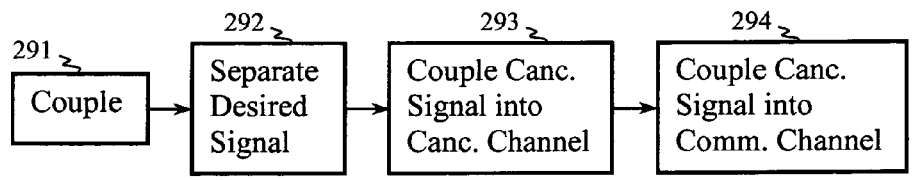
FIG. 17C is a flow diagram that describes a process for canceling communication signals in a communication channel.

A process for canceling communication signals from in a communication channel is shown in FIG. 17C. Signals are coupled out of a communication channel in a coupling step 291. At least one desired signal is detected from the coupled signals in a separation step 292. The desired signals are coupled into a cancellation channel that runs parallel to the communication channel in step 293. The signals from the cancellation channel are coupled into the communication channel to cancel the signals received by the receiver in a final step 294. Adjustment of the desired signal to create a cancellation signal may be performed in either or both steps 293 and 294.

Redundantly modulated multicarrier signals, such as CDMA-CIMA signals, enable signal differentiation in both time and frequency domains. CDMA-CIMA codes that are unique in the time domain also have unique frequency-versus-amplitude profiles. The DS-CDMA signals are determined by weights applied to each carrier. Therefore, frequency diversity as well as code diversity can be used to achieve multiple access.

Figure 18:
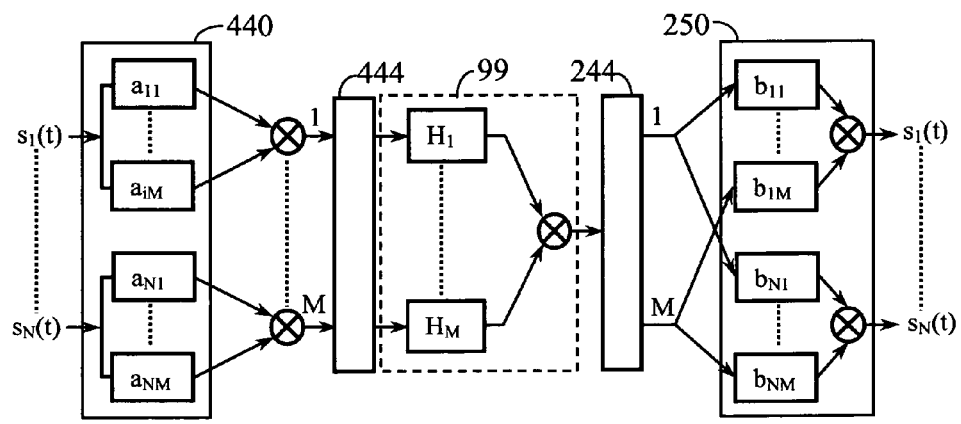
FIG. 18 is a process diagram for a diversity-based cancellation system.

FIG. 18 shows a process diagram for a diversity-based cancellation system. Each of a number N of information signals $s_n(t)$ receive a plurality of weights in a weighting process 440. A weighting system (not shown) may apply real or complex weights to the signals $s_n(t)$. The weighting system may include magnitude and phase adjustment circuits or processes and the weights may be deterministic or adaptive.

The weighted signals are processed in a coding process 444. The coding process 444 may include the weighting process 440. The coding process 444 may include one or more N-point transforms. The variable N in an N-point transform does not necessarily correspond to the number N of information signals or other variables used throughout this specification. N-point transforms include DFT, FFT, WT, HT, RT, PT, Inverse DFTs, Inverse FFTs, Inverse WTs, Inverse HTs, Inverse RTs, Inverse PTs, and any other reversible transform. The coding process 444 can be regarded as a multicarrier-generation process. M coded signals are coupled into a communication channel 99, which may operate on the signals. Coded signals coupled out of the channel 99 are decoded in a decoding process 244. The decoding process 244 may include at least one M-point transform. A decoding process, such as decoding process 244, can be regarded as a multicarrier-separation process. A separator (not shown) may perform the decoding process 244.

A set of M decoded signals are coupled into an interference-cancellation process 250 that separates the desired signals $s_n(t)$ from interference and outputs the separated desired signals $s_n(t)$. The interference-cancellation process 250 may include cancellation and/or constellation processes. Throughout this specification, the term "interference" is meant to convey any interfering signals including other desired signals $s_n(t)$. The interference-cancellation process 250 or the decoding process 244 may separate the modulated desired signals $s_n(t)$ from the carrier signals, or reduce the received carriers to a carrier having a common diversity parameter. The interference-cancellation process 250 is a signal-separation process. Any type of signal-separation process may be used. The interference-cancellation process 250 may include any type of multi-user or multi-channel detection processes.

The diversity-based cancellation process shown in FIG. 18 is described in U.S. patent application Ser. No. 09/347, 182 wherein the coding process 444 is an inverse FFT and the decoding process 244 is an FFT. The decoding process 244 produces M equations with N unknown signals $s_n(t)$. The M equations result from detection (or separation) of the M carriers. To explicitly solve for the N unknowns, M must be greater or equal to N.

The interference-cancellation process 250 may perform signal analysis using a different diversity parameter than the one or more diversity parameters that define the carriers. For example, frequency-diverse carriers may be summed and evaluated in the time-domain to separate information signals $s_n(t)$ encoded on the carriers. Weight-and-sum processes (or other types of cancellation) may be performed on the time-domain signals in order to remove interference and separate the desired signals $s_n(t)$.

Figure 19:
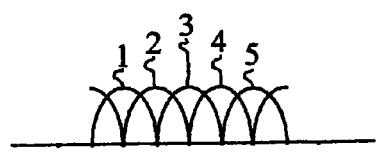
FIG. 19 is a time-domain representation of a plurality of frequency-domain encoded signals.

FIG. 19 shows a time-domain representation of a plurality of frequency-domain encoded signals. Each pulse 1, 2, 3, 4, and 5 represents a CIMA signal having three (M=3) multi-frequency carrier signals. CIMA enables 2M quasi-orthogonal signals in the time domain if data symbols modulated on the carrier signals are limited to binary phase shift key or amplitude modulation, whereas carrier processing yields only M equations. Since the quality of quasi-orthogonal signals can be improved using multi-user detection (which involves the same processes as interference cancellation), processing signals in a diversity-parameter domain that enables quasi-orthogonality of the signals being processed increases the capacity of the communication system. This realization may be extended to many different diversity-parameter domains. For example, many types of multicarrier-defined diversity-parameter domains (such as frequency) may be used to generate CIMA signals that can be processed in the time domain. One of the benefits of alternative diversity-parameter processing is that, in some cases, the benefits of both diversity and enhanced capacity can be obtained.

Figure 20A:
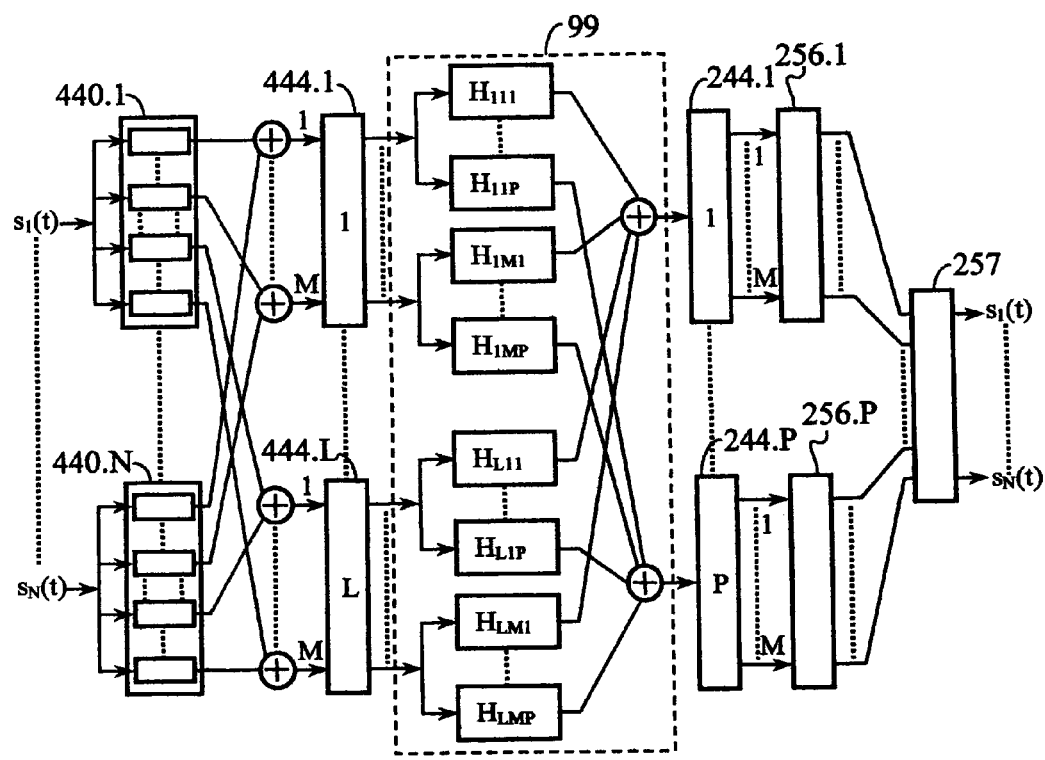
FIG. 20A is a process diagram describing the functions performed by a multiple-diversity communication system.

Different diversity parameters may be combined to increase capacity and/or diversity benefits in a communication system. FIG. 20A shows a process diagram of a multiple-diversity communication system. A plurality N of information signals $s_n(t)$ are weighted in a plurality N of weighting processes 440.1 to 440.N. Weighted information signals are coded by a plurality L of coders 444.1 to 444.L or the weighted information signals control the coding of carrier signals generated by the coders 444.1 to 444.L. The coded signals are coupled into a communication channel 99.

Coded signals are coupled out of the communication channel 99 and decoded by a plurality of decoding processes 244.1 to 244.P. The decoded signals are coupled to a plurality of signal-separator processes 256.1 to 256.P. Each of the signal-separator processes 256.1 to 256.P generates a plurality of signals representing equations having a number N' of unknowns. A plurality of the signal-separator processes 256.1 to 256.P generates a number of equations that does not equal or exceed the number N of unknowns. However, the number of equations generated by all of the signal-separator processes 256.1 to 256.P equals or exceeds the number N of unknowns. A second-stage signal-separator process 257 may be implemented to combine the equations generated by the signal-separator processes 256.1 to 256.P and determine explicitly the values of the information signals $s_n(t)$. A signal-separator process (such as the signal-separator processes 256.1 to 256.P) may be any interference-cancellation process (using either or both cancellation and constellation processes), such as multi-user detection or multi-channel detection.

One or more of the signal-separator processes 256.1 to 256.P and 257 may perform quasi-orthogonal signal separation in an alternative diversity-parameter domain. For example, one or more of the signal-separator processes 256.1 to 256.P and 257 may include combining received signals and processing the superposition of the signals in the time domain.

Figure 20B:
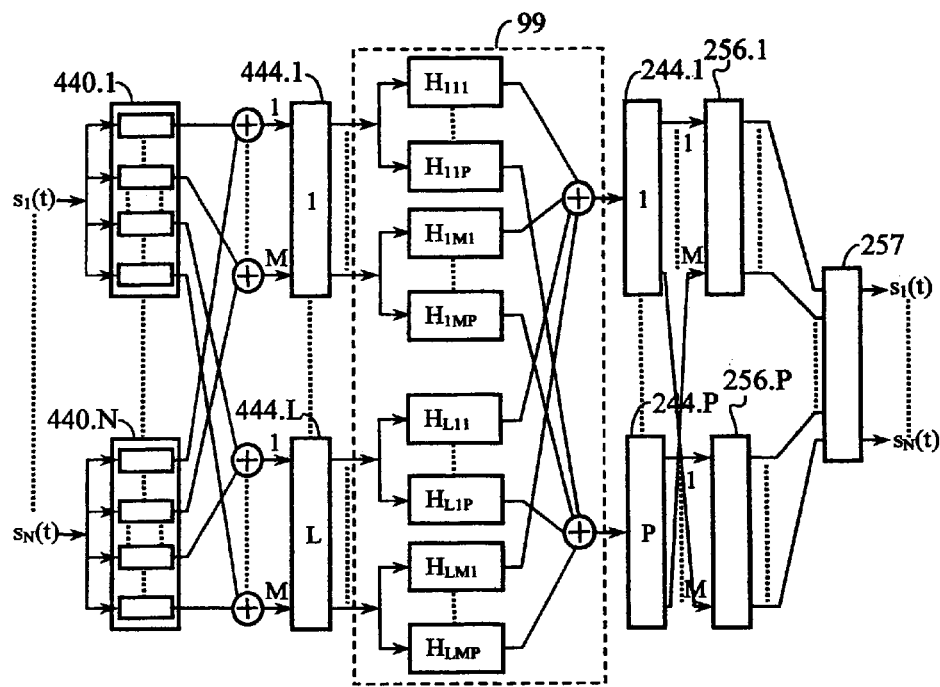
FIG. 20B is an alternative process diagram for a multiple-diversity communication system.

FIG. 20B shows an alternative process diagram for a multiple-diversity communication system. A plurality N of information signals $s_n(t)$ are weighted in a plurality N of weighting processes 440.1 to 440.N. Weighted information signals are coded by a plurality L of coders 444.1 to 444.L or the weighted information signals control the coding of carrier signals generated by the coders 444.1 to 444.L. The coded signals are coupled into a communication channel 99.

Coded signals are coupled out of the communication channel 99 and decoded by a plurality of decoding processes 244.1 to 244.P. The decoded signals from each decoding process are coupled into a plurality of signal-separator processes 256.1 to 256.P. Outputs from the signal-separator processes 256.1 to 256.P may be coupled to a second-stage signal-separator process 257.

Signal coding (described throughout the specification) with respect to transmitter-side coding can involve encoding carrier signals with weights according to a signal profile (such as a spatial gain distribution at a receiver) that facilitates the separation of multiple received information signals having the same carriers. The weights may be deterministic or adaptive. The weights may be complex. A weight coder may include at least one phase shifter and/or delay device. Decoding processes may include cancellation or constellation methods of signal estimation.

U.S. patent application Ser. No. 08/862,859 describes spatial gain variations of signals transmitted in free space. The spatial gain of a received signal is the complex-valued amplitude of the signal relative to at least one signal space. A signal space is defined by at least one diversity parameter. PCT Appl. No. WO95/03686, entitled "Active Electromagnetic Shielding" describes how receivers that are spatially separated receive different proportions of signals from spatially separated transmitters. The Active Electromagnetic Shielding application also describes cancellation circuits that can be used to separate desired signals from interfering signals.

Spatial gain distributions describe all effects that result in the complex amplitude or other characteristic of a signal varying with respect to a diversity parameter (or signal space). Spatial gain distributions result from propagation effects including, but not limited to multipath fading, shadowing, absorption, scattering, path loss, and diffraction. Spatial gain distributions may also be determined by either or both transmitter- and receiver-related parameters, such as directivity, masking, diffraction, polarization, phase space, and coding.

Both wireless and guided-wave signals have spatial gain variations. In free space, spatial gain variations result from many environmental effects such as shadowing, multipath, absorption, scattering, and path loss. Spatial gain variations can also be affected by the transmission system, which can control beam shape, directionality, and polarization. Dispersion, reflections, attenuation, and amplification can affect spatial gain in a waveguide.

Frequency gain variations can result from the frequency-dependent nature of spatial gain variations. Frequency gain is the complex amplitude-versus-frequency distribution of a frequency-diverse signal. Differences in the amplitudes of each frequency component of frequency-diverse signals transmitted from different transmitters enable multiple access via cancellation or constellation processing methods. U.S. patent application Ser. No. 09/347,182 describes the use of frequency diversity as a spatial processing technique that does not require an antenna array. Another benefit of the frequency-diversity method compared to spatial diversity methods is that it does not rely on the fast-fading environment of the communication channel. Frequency diversity multiplexing can be performed in any multipath environment.

Figure 21A:
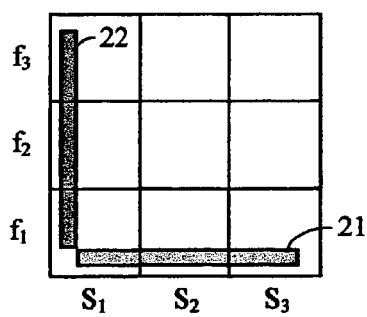
FIG. 21A is a graphical representation of two different types of diversity processing.

FIG. 21A illustrates two diversity parameters that can be used for increasing diversity or capacity. Spatial processing is illustrated by a horizontal bar 21. Spatial processing is performed in a particular frequency band (such as $f_1$) in order to enable reuse of that band. System capacity can be proportional to the number of spatial locations (such as $S_1$, $S_2$, and $S_3$) from which signals are sampled. Optimal bandwidth efficiency is achieved when each frequency band is used to transmit different information streams. In conventional multiple-access schemes, redundantly transmitting information in the frequency domain reduces bandwidth efficiency.

Frequency-diversity processing is illustrated by a vertical bar 22 that spans multiple frequencies $f_1$, $f_2$, and $f_3$. Information is redundantly transmitted on each of the frequency bands. Using the cancellation or constellation methods described in the '182 application, multiple redundantly transmitted information signals can be separated. Frequency-diversity processing may be performed at multiple receiver locations (such as $S_1$, $S_2$, and $S_3$) in order to achieve the optimal bandwidth efficiency.

Frequency-diversity processing benefits systems that have a small number of antennas by providing frequency reuse and mitigating signal loss due to deep fades. Although it is counter-intuitive to redundantly modulate carrier signals when attempting to increase capacity, redundant-modulation techniques (such as frequency-diversity processing and CIMA) can provide improved capacity as well as diversity. A unique aspect of the invention is that redundant modulation with respect to a diversity parameter achieves an increase in bandwidth efficiency.

Figure 21B:
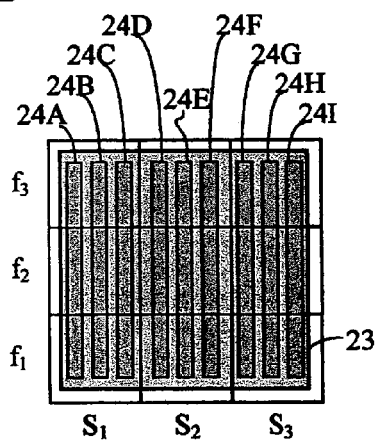
FIG. 21B is a graphical representation of a hybrid form of diversity processing that makes use of at least two forms of diversity processing.

FIG. 21B illustrates the use of nested interferometry to optimize capacity. Redundantly modulated carriers having different frequencies are frequency-diversity processed at each spatially separated receiver. Each receiver produces three equations having a number of unknown information signals. These equations can be linked together via spatial processing (which in this case is the process of combining the equations) to create nine unique equations. Therefore, up to nine different unknown signals can be solved explicitly in this example.

Either of the diversity parameters shown in FIG. 21A and FIG. 21B may be replaced by another diversity parameter. Signal-diversity parameters include signal characteristics, such as polarization states, frequencies, time, phase space, modes, directionality, and CDMA or other spread-spectrum codes. Carrier signals may be defined by any of these parameters or any combination of these parameters. FIG. 21A and FIG. 21B may include additional axes representing additional diversity-parameter dimensions that may be used for multiplexing, diversity, and interferometric combining.

Figure 22A:
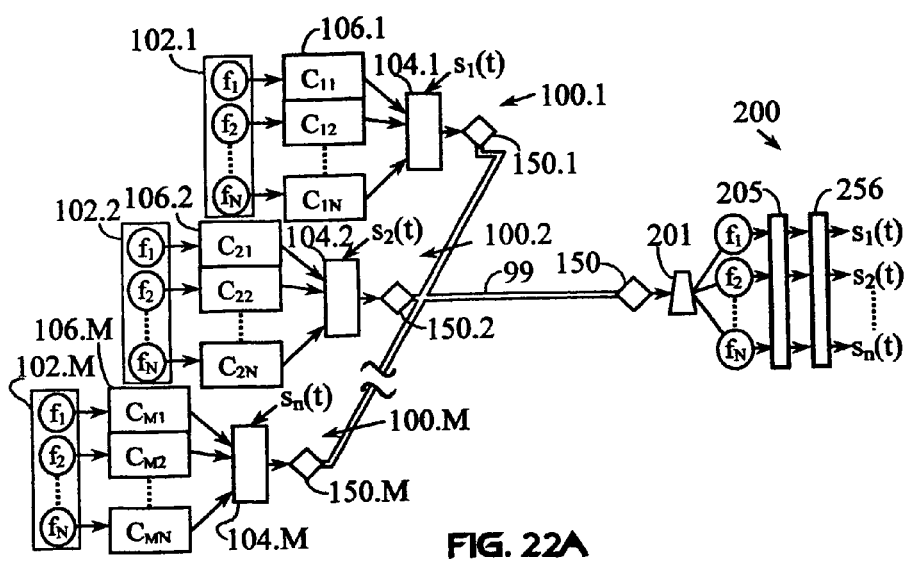
FIG. 22A is a schematic of a frequency-diversity interferometry multiplexing system.

FIG. 22A shows a frequency-diversity interferometry multiplexing system. A plurality of transmitters 100.1 to 100.M each includes a carrier-signal generator 102.1 to 102.M, a carrier-code generator 106.1 to 106.M, an information-signal modulator 104.1 to 104.M, and a coupler 150.1 to 150.M coupled to a communication channel 99. At least one receiver 200 is coupled to the communication channel 99. The receiver 200 includes a separator, such as wavelength demultiplexer 201, which is coupled to a down converter 205 and an interference canceller 256. A down converter (such as down converter 205) may be a decoder.

Each carrier-signal generator 102.1 to 102.M generates a plurality of carrier signals. Each of the carrier signals is distinguished by values of one or more diversity parameters. In this case, the carrier signals are distinguished by different frequencies ($f_1$, $f_2$, ... $f_n$). It is assumed that each of the signal generators 102.1 to 102.M generates a similar set of carrier signals. Each set of carrier signals is modulated by a plurality of carrier codes ($c_{mn}$) from its respective carrier-code generator 106.1 to 106.M. The codes generated by the carrier-code generator 106.1 to 106.M appear unique when observed by the receiver 200. Each set of coded carrier signals is modulated by one of the information-signal modulators 104.1 to 104.M. Each of the modulated carriers is coupled into the communication channel 99. The channel 99 may be wireless, waveguide, or a combination of both.

Transmitted signals are coupled out of the communication channel 99 and received by the receiver 200. The receiver 200 demultiplexes the received signals into wavelength (or frequency) components. Wavelength demultiplexing may include converting the received signals to electrical signals and performing digital signal processes, such as Fourier transforms. Demultiplexing may also be performed using conventional optical demultiplexing techniques. The demultiplexed signals are down converted to a common frequency band. The frequency band may be the baseband information signal or some intermediate frequency. The down converting process may be performed during wavelength demultiplexing. The down converted signals are coupled into a canceller 256, which separates the interfering signals using a cancellation method, such as weight and sum. The canceller 256 may also perform a constellation method in addition to, or instead of the cancellation method.

Separation (i.e., an explicit solution) of the information signals depends on receiving a number of algebraically unique proportions of the signals by the receiver. Separation quality (e.g., signal to noise, signal to interference, or signal to noise plus interference) depends on the proportions of the received signals. The proportions are determined by the carrier codes applied to carrier signals and the effect of the channel on the transmitted carriers.

Optimizing the separation quality of the received signals can be achieved by adjusting the carrier codes and the channel characteristics. Carrier codes are adjusted by any of the carrier-code generators 106.1 to 106.M. The channel 99 can be adjusted by adjusting transmission characteristics that affect the channel 99. In a wireless system, the directionality of a transmitting antenna determines the channel through which transmitted signals propagate. In either of these cases, a known training sequence may be used to optimize the separation quality. The training sequence may be performed in a predetermined orthogonal channel, such as a time interval, spread-spectrum code, frequency band, directivity, phase space, or polarization.

Figure 22B:
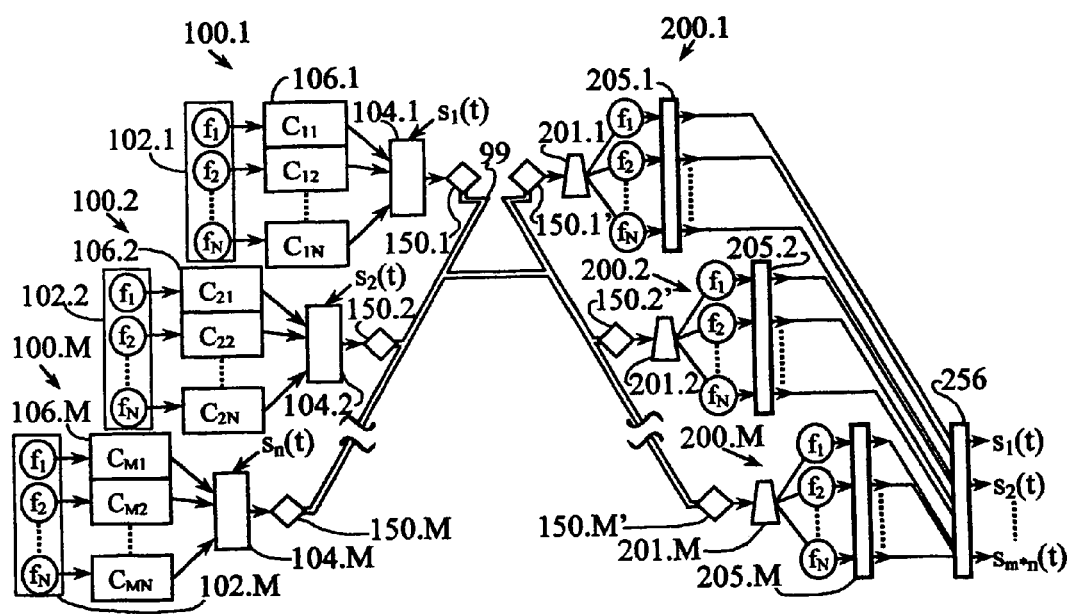
FIG. 22B is a diagram of a cascaded interferometry system that uses frequency-diversity interferometry multiplexing and spatial interferometry multiplexing.

FIG. 22B shows a cascaded interferometry system that uses frequency-diversity interferometry multiplexing and spatial interferometry multiplexing. A cascaded interferometry system is defined as a communication system that performs interferometry with at least two different diversity parameters to enhance capacity. The transmitters are the same as in FIG. 22A. However, there is a plurality of spatially separated receivers 200.1 to 200.M. Each of the receivers 200.1 to 200.M includes a separator, such as a wavelength demultiplexer 201.1 to 201.M, coupled to a down converter 205.1 to 205.M. The outputs of the down converters 205.1 to 205.M are input to an interference canceller 256.

Coded transmission signals that are coupled into the channel 99 have an amplitude-versus-frequency profile that depends on the coding of the carrier signals. As the signals propagate through the channel 99, their amplitude-versus-frequency profile can change. Signals may exhibit different amplitude-versus-frequency profiles at different locations in the channel 99. Signals in the channel 99 are expressed by the following equation:

$$C_1(x)s_1(t)+C_2(x)s_2(t)+\ldots+C_N(x)s_N(t)$$

$C_n(x)$ is the amplitude-versus-frequency profile associated with the $n^{th}$ transmitted information signal $s_n(t)$. The value of the amplitude-versus-frequency profile $C_n(x)$ depends on the $n^{th}$ code applied to the signal $s_n(t)$ and a channel parameter x. The channel parameter x describes the state of the communication channel at a specific location in the channel relative to the location of the transmitter(s). Signals $R_k(t)$ received by a $k^{th}$ receiver are given by the following equation:

$$R_k(t)=C_1(x_k)s_1(t)+C_2(x_k)s_2(t)+\ldots+C_N(x_k)s_N(t)$$

The amplitude-versus-frequency profile $C_n(x_k)$ of signals received by the $k^{th}$ receiver may depend on the relative location (and in some cases, the absolute location) of the $k^{th}$ receiver with respect to the transmitter(s).

The received signals $R_k(t)$ are wavelength demultiplexed (e.g., separated into their component wavelengths or frequencies) into M component signals. The information signals $s_n(t)$ are removed from the component signals or otherwise converted to signals having a common carrier frequency. The demultiplexing and down-conversion processes produce a plurality M of component signals $R_{km}(t)$ representing combinations of the information signals $s_n(t)$. The component signals $R_{km}(t)$ may represent either linear or nonlinear combinations of the information signals $s_n(t)$. Preferably, the combinations are algebraically unique.

An expression for a particular component signal $R_{km}(t)$ that consists of a linear combination of information signals $s_n(t)$ is represented by:

$$R_{km}(t)=(\alpha_{1k}+\alpha_{2k}+\ldots+\alpha_{Nk})s_1(t)+(\beta_{1k}+\beta_{2k}+\ldots+\beta_{Nk})s_2(t)+\ldots+(\zeta_{1k}+\zeta_{2k}+\ldots+\zeta_{Nk})s_N(t)$$

Each of the information signals $s_n(t)$ has a series of scaling factors $\alpha_{mk}, \beta_{mk}, \ldots, \zeta_{mk}$ that depends on the amplitude-versus-frequency profile $C_n(x)$ applied to the carrier signals. The values of the scaling factors also depend on the effect of the communication channel 99 on the profile. The number N of scaling factors in each series is the number of signals $s_n(t)$ transmitted by different transmitters. Because there are M component signals $R_{km}(t)$ (which represent M equations of N unknowns), it is preferable that M be greater or equal to the number N of unknowns if there is only one receiver.

If there are K receivers, the number of component signals (equations) $R_{km}(t)$ presented to the canceller 256 is K•M. If the number of algebraically unique equations input to the canceller exceeds the number of unknowns (information signals $s_n(t)$), the unknowns can be solved explicitly. The output of the canceller 256 includes the information signals $s_n(t)$ or estimates of the information signals $s_n(t)$.

Figure 23:
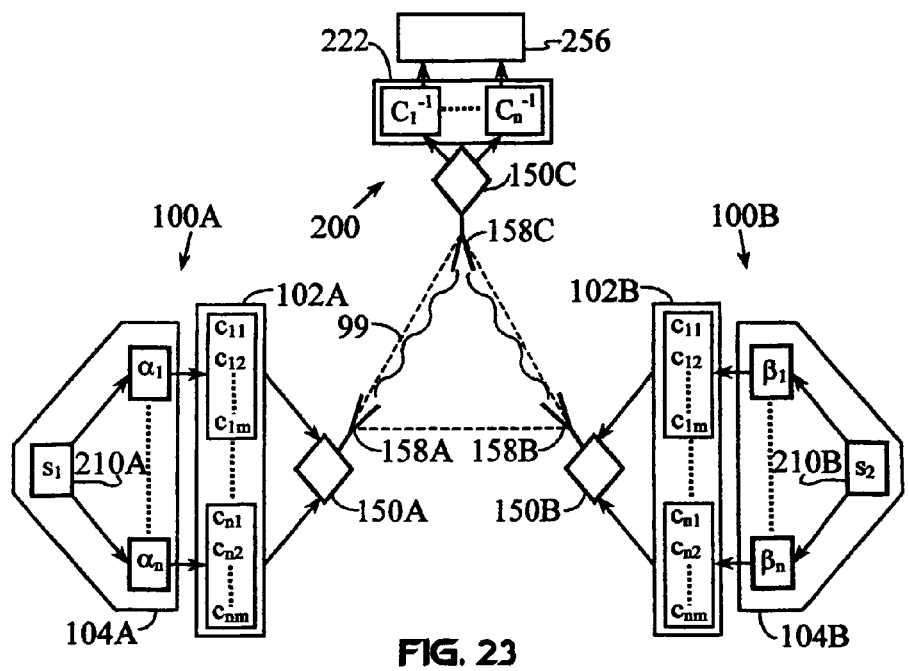
FIG. 23 is a diagram of a spread-spectrum interferometer.

FIG. 23 shows a spread-spectrum interferometer that can be used in a communication channel 99. At least two transmitters 100A and 100B transmit redundantly coded information signals $s_n(t)$ that are received and decoded by at least one receiver 200. The received signals undergo interference cancellation to separate or estimate the information signals $s_n(t)$.

A first transmitter 100A includes a signal modulator 104A that receives at least one information signal $s_1(t)$ and provides a plurality of weights $\alpha_1$ and $\alpha_2$ to the information signal $s_n(t)$ to generate a plurality of weighted information signals. The weighted information signals may be used to modulate a plurality of spread-spectrum signals produced by a multicarrier-signal generator 102A wherein each of the spread-spectrum signals is considered a carrier. The spread-spectrum signals may be CDMA, Frequency Hopped, Time Hopped, hybrid spread spectrum, N-point transform, or any type of multicarrier spread-spectrum signals. The weighted information signals may be input to the multicarrier-signal generator 102A and processed to produce a plurality of spread-spectrum signals that are information coded. The information-coded signals are coupled into the communication channel 99 by a coupler 150A. In this case, the communication channel 99 is a wireless channel and the coupler includes an antenna 158A. The signals that are coupled into the channel 99 by the first transmitter 100A are represented by the following expression:

$$C_1(\alpha_1 s_1(t)) + C_2(\alpha_2 s_1(t))$$

A second transmitter 100B that has the same general design as the first transmitter 100A couples a plurality of spread-spectrum carrier signals into the channel 99. Each spread-spectrum carrier signal is modulated with at least one weighted ($\beta_1$, $\beta_2$) information signal $s_2(t)$. The signals that are coupled into the channel 99 by the second transmitter 100B are represented by the following expression:

$$C_1(\beta_1 s_1(t)) + C_2(\beta_2 s_2(t))$$

Spread-spectrum signals $C_1$ and $C_2$ represent different coded spread-spectrum signals. The spread-spectrum signals have characteristics that depend on their coding and the signals that they encode. Although two or more spread-spectrum signals (such as $C_1(\alpha_1 s_1(t))$ and $C_1(\beta_1 s_1(t))$ use the same code, the coded signals have values that depend on their arguments ($\alpha_1 s_1(t)$ and $\beta_1 s_1(t)$). A coupler 150C that includes at least one antenna 158C couples the transmitted signals out of the channel 99 for providing received signals to the receiver 200.

The values of the coded signals are realized upon decoding the spread-spectrum signals $C_1(\alpha_1 s_1(t))$ and $C_1(\beta_1 s_2(t))$ and separating interfering signals. A decoder 222 decodes the received signals using a plurality of inverse spreading codes. If multiple information signals had been encoded with the same spread-spectrum code, the process of decoding those signals produces multiple interfering information signals. The interfering signals are input to an interference canceller 256 that separates the signals using cancellation or constellation techniques.

The values $\alpha_1$, $\alpha_2$, $\beta_1$, and $\beta_2$ applied to the transmitted information signals $s_1(t)$ and $s_2(t)$ represent any method of adjusting the information signals $s_1(t)$ and $s_2(t)$ to allow differentiation between decoded received signals. The step of adjusting the information signals $s_1(t)$ and $s_2(t)$ may result from the signals propagating in the channel 99. Differentiation may be achieved by any combination of interference cancellation, constellation techniques, filtering, and demodulation.

Figure 24:
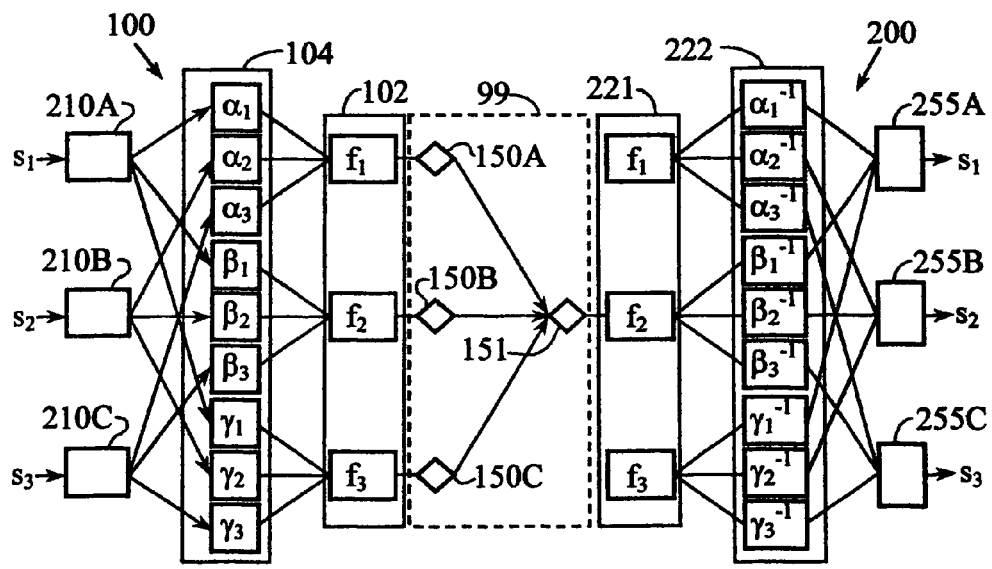
FIG. 24 is a schematic of a redundant-carrier communication system in which a plurality of carriers are received and separated with respect to at least one diversity parameter and then processed and combined with respect to another diversity parameter.

FIG. 24 shows a redundant-carrier communication system in which a plurality of carriers are received and separated with respect to at least one diversity parameter and then processed and combined with respect to another diversity parameter. In particular, carriers that are defined by signal frequency are modulated with time-dependent or phase-dependent coded information signals. A signal consisting of the modulated carriers is received and separated into individual modulated carriers. The carriers are decoded and summed to recover the time-domain information signals.

A transmitter 100 receives a plurality of information signals $s_1(t)$, $s_2(t)$, and $s_3(t)$, which are split by a plurality of splitters 210A, 210B, and 210C. The split signals are coded by a modulator 104 that acts upon a plurality of carrier signals produced by a carrier-signal generator 102. Carrier signals that are coded and modulated with the information signal are coupled into a communication channel 99 by a plurality of couplers 150A, 150B, and 150C.

At least one receiver 200 receives the coded and modulated carrier signals. At least one coupler 151 couples the carriers out of the channel 99 to a carrier separator 221 that separates the received carrier signals. In this case, the carriers are defined by their wavelength (or frequency). The carrier separator 221 may be a wavelength demultiplexer (not shown). The separated carriers are input to a weight compensator 222 that applies inverse coded signals with respect to the codes applied to the carriers by the modulator 104. The weight compensator 222 may compensate for variations of the code values resulting from distortion in the channel 99, the coupler(s) 150 and 151, the transmitter 100, and the receiver 200.

A plurality of carrier signals having different wavelengths are combined in each of a plurality summing devices 255A, 255B, and 255C. The summed signals are time-domain representations of the transmitted information signals $s_1(t)$, $s_2(t)$, and $s_3(t)$. The summing devices 255A, 255B, and 255C may include signal processors to shape the summed signals or filter the resulting sums to remove interference and/or noise. Signals output from each summing device 255A, 255B, and 255C may include one information signal. The outputs of the summing devices 255A, 255B, and 255C may be coupled to a multi-user detector (not shown) for removing interference in signals output from the summing devices 255A, 255B, and 255C.

One of the benefits of the receiver 200 shown in FIG. 24 is that it achieves separation of signals that interfere in at least one diversity dimension by processing the signals in a different diversity dimension. In this case, redundantly modulated carrier frequencies are combined and processed in the time domain to demultiplex multiple information signals modulated on the carriers. Separation of the information signals can be accomplished using a single-stage weight-and-sum processor and filters instead of a multi-stage cancellation network.

Figure 25A:
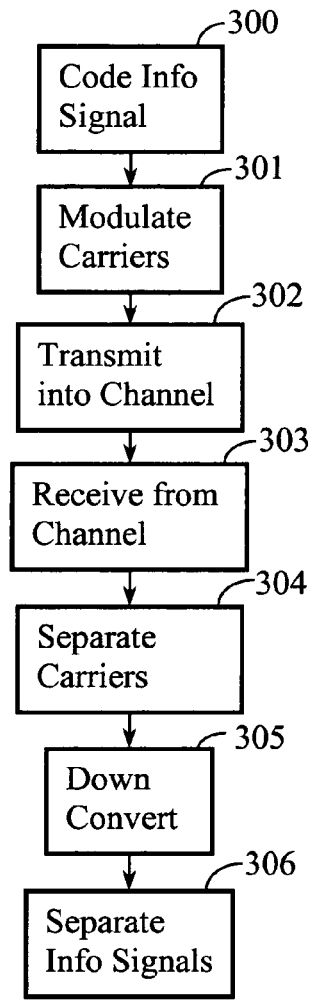
FIG. 25A is a process diagram that outlines a method of communication that uses redundantly modulated multicarrier signals.

FIG. 25A illustrates a method of communication that uses redundantly modulated multicarrier signals. A coding step 300 is an optional step that may be used to apply a code to at least one information signal $s_n(t)$. The code may be a spread-spectrum code, an encryption code, or a multicarrier code that can be used to help separate multiple received signals. The coding step 300 may involve applying the code directly to a plurality of carriers before or after a modulation step 301 in which the carriers are redundantly modulated with the information signal(s). The carriers are defined by at least one diversity parameter. The modulated carriers are coupled into a communication channel in a transmit step 302. The carriers may be coupled into the channel by more than one coupler. The communication channel may be a wireless or guided wave channel. The transmit step 302 depends on the spectrum of the electromagnetic carriers and the type of channel. The transmit step 302 may also depend on characteristics of the carriers (such as phase and polarization). The channel may perform or enhance the coding step 300 as the carrier signals propagate through it. Thus, the coding step 300 may be affected by the propagation characteristics of the channel.

A receive step 303 describes the process of coupling the modulated carriers out of the channel. The method of receiving the carriers depends on the channel and the characteristics of the modulated carriers. For example, polarized carriers may be received by receivers having at least one predetermined polarization. The receive step 303 may involve coupling signals out of the channel from multiple couplers. The couplers may be spatially separated or otherwise separated with respect to at least one diversity parameter.

The received carriers are separated in a carrier-separation step 304 that separates the carrier signals with respect to at least one diversity parameter. Separation of the received carriers may be performed by at least one demultiplexer, such as a wavelength demultiplexer, a bank of frequency filters, a polarization device, a spread spectrum decoder, or a time-domain sampler. Each of the carriers is down-converted to a predetermined frequency band in a down-convert step 305. Down-conversion may be a heterodyne or homodyne process. The down-conversion step 305 may involve the removal of the carrier signal(s) from the information signal(s). The predetermined frequency band may be the information baseband or an intermediate-frequency signal. The down-converted signals are combined in an information-signal separation step 306. The separation step 306 may involve at least one cancellation method (such as a weight-and-sum cancellation), at least one constellation method, or a combination of cancellation and constellation methods. The separation step 306 may involve a method of nonlinear processing as part of a method combining cancellation and constellation processing.

Figure 25B:
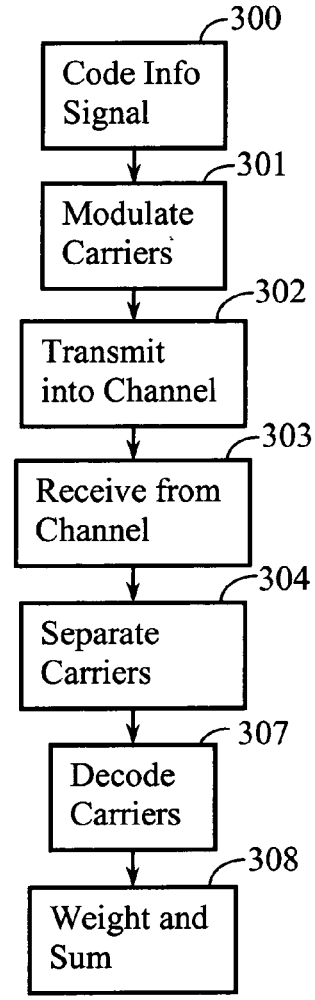
FIG. 25B is a process diagram that describes another method of communication that uses redundantly modulated carrier signals.

FIG. 25B illustrates a method of communication that uses redundantly modulated carrier signals. The communication method of FIG. 25B has the same coding step 300, modulation step 301, transmit step 302, receive step 303, and carrier-separation step 304 shown in FIG. 25A. The carrier-separation step 304 is an optional step that may be performed in conjunction with the receive step 303, or it may be performed as part of an optional decoding step 307. The decoding step 307 involves compensating for the variation in the relative phase between at least some of the received carrier signals due to deliberate coding (such as the coding step 300) or unintentional coding (such as distortion resulting from propagation in the channel). The carriers are acted on by a weight-and-sum step 308 for combining the carriers to produce a time-domain signal that is processed by a time-domain processor. Weights applied to the carriers may be complex weights that adjust phase or add delay to the carriers. The weighting of the signals may be performed by the decoding step 307. The weight-and-sum step 308 may involve only summing.

Figure 25C:
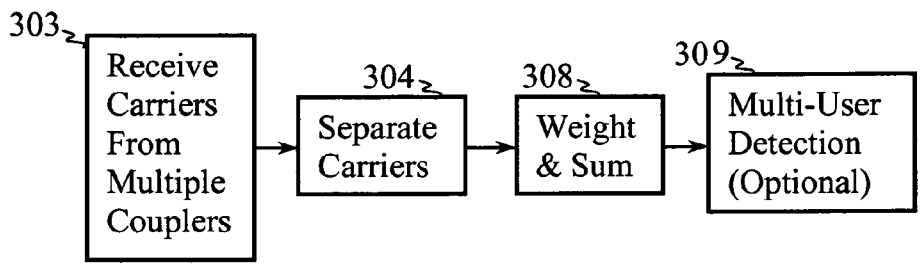
FIG. 25C is a process diagram that outlines a method of receiving communication signals that include redundantly modulated carrier signals.

FIG. 25C illustrates a method of receiving communication signals that include redundantly modulated carrier signals. Redundantly modulated carrier signals are coupled out of a communication channel in a receive step 303. The receive step 303 provides reception via multiple couplers to generate a plurality of different samples of received multicarrier signals. A carrier separation step 304 separates the carrier signals from each of the plurality of couplers. This step 304 may include down converting the modulated carriers to a common frequency or separating the modulation signals from the carrier signals. A weight-and-sum step 308 involves coupling different carrier signals from a plurality of the couplers into a canceller (such as a weight-and-sum canceller) or a constellation processor. An optional multi-user detection step 309 involves receiving signals output from the canceller and optimizing detection using an optimization technique. The multi-user detection step 309 may be incorporated into the weight-and-sum step 308.

An optimization technique involves any kind of dynamic process for adjusting weights in an interference-cancellation system/process or other channel-inversion system/process. Optimization may involve an iterative update process that causes convergence of the weight values. An optimization process may include the use of an update processor that computes a rate of change for each time-varying weight or channel parameter. The update processor may adjust weights of a canceller or channel inverter (such as an inverse filter) in response to a rate of change associated with the channel. The optimization technique may involve any optimal control technique including maximum or minimum functions, finite-element optimizations, and calculus of variations.

Figure 26:
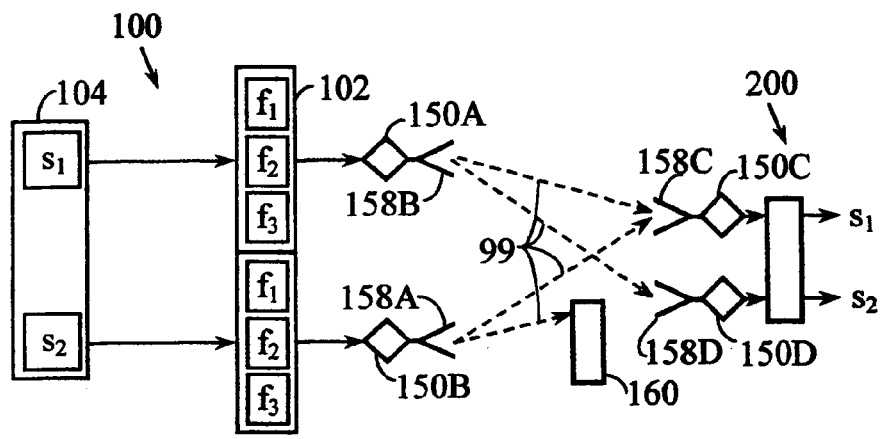
FIG. 26 is a schematic diagram of a communication system that uses redundantly modulated carriers to enhance diversity and uses spatial interferometry multiplexing to increase capacity.

FIG. 26 shows a communication system that uses redundantly modulated carriers to enhance diversity and uses spatial interferometry multiplexing to increase capacity. Spatial interferometry multiplexing may provide reuse of the diversity parameter (e.g., frequency or polarization) that defines the carriers. A modulator 104 modulates a plurality of information signals $s_n(t)$ onto a plurality of carrier signals generated by a multicarrier-signal generator 102. In this case, the signal generator 102 produces carrier signals having different frequencies $f_1$, $f_2$, and $f_3$. The modulated multicarrier signals are coupled into a communication channel 99 by a plurality of couplers 150A and 150B. In this case the communication channel 99 is a wireless-communication environment. Each coupler 150A and 150B includes an antenna 158A and 158B, respectively. The antennas 158A and 158B may be separated antenna elements or antenna-array processors (not shown).

Modulated carriers may experience spatial gain variations (spatially dependent variations of their complex amplitudes) due to propagation effects (such as multipath, shadowing, path loss, absorption, and scattering) or transmitter 100 parameters (such as beam shape, carrier weights, information-signal weights, and scanning). Modulated carrier signals are coupled out of the channel by a plurality of couplers, such as antennas 158C and 158D. A receiver 200 separates and processes the information signals $s_n(t)$ modulated on the carriers. The receiver 200 may include a multi-user detector and/or a diversity combiner. The receiver 200 may have a design similar to the receiver design shown in FIG. 22A, FIG. 22B, and/or FIG. 23. The receiver 200 may include a receiver module (as shown in FIG. 24) for each receiver coupler 158C and 158D.

One benefit of the communication system shown in FIG. 26 is that the use of redundantly modulated frequency-diverse carriers reduces the influence of the communication channel on the spatial gain of the received signals. For example, in a narrow band system (or OFDM system where different frequency bands carry different information streams) rapid variations occur in the received signals' gain due to changes in the signal paths between the transmitter 100 and the receiver 200. Changes in the signal paths result from relative motion between the transmitter 100 and the receiver 200. Objects (such as reflector 160) that move in the communication environment can cause signal-path changes if these objects reflect signals that propagate between the transmitter 100 and the receiver 200. The variation in intensity occurs rapidly (especially at high frequencies) because path variations as small as a fraction of a wavelength can significantly effect the gain of the received signals.

In spatial interferometry multiplexing, weights in a spatial demultiplexer are set according to training sequences. Transmitted signals having predetermined values are received and used to calibrate the spatial demultiplexer. In a flat-fading environment, the spatial demultiplexer needs to be calibrated frequently.

Frequency diversity mitigates flat fading. Information signals $s_n(t)$ transmitted on different carriers are combined in the receiver 200 to generate a plurality of composite information signals $s'_n(t)$. Because frequency-selective fading has a minimal impact on the gain of the composite information signals $s'_n(t)$, large-scale fading effects (such as shadowing and path loss) may be relied upon to provide the composite information signals $s'_n(t)$ with predetermined spatial gains. For example, reflector 160 may provide a large-scale slowly varying effect, such as shadowing. The reflector 160 blocks the direct path of a transmission from the transmit antenna 150B to the receive antenna 158D.

Large-scale fading effects require less-frequent updates of the weights in the receiver 200 than small-scale flat fading. Frequency diversity can reduce the effects of the channel 99 on transmitter-controlled and receiver-controlled spatial gain distributions of the signals $s'_n(t)$. The spatial gain distributions may be controlled by either or both the transmitter 100 and the receiver 200 using relative positions of couplers, coupler directionality, masking, polarization, or various combinations of transmitter and/or receiver control methods.

Although only two transmitter couplers 150A and 150B and two receiver couplers 158C and 158D are shown, the number of either set of couplers may be greater. The transmitter 100 may include a plurality of couplers 150A and 150B as shown in FIG. 26 or the there may be a plurality of transmitters having one or more couplers (not shown). The number of receiver couplers (such as couplers 158C and 158D) may exceed the number of carriers. Likewise the number of transmitter couplers (such as couplers 150A and 150B) may exceed the number of carriers. Spatial interferometry multiplexing may be performed to separate the received signals or to improve signal quality if both the number of carriers and the multiple access scheme are sufficient to provide estimates of the unknown signals. Diversity combining may also be used to enhance signal quality, preferably when the diversity parameters are not needed for enhancing system capacity.

The number of received signals that can be separated can be proportional to the number of receiver couplers. The number of received signals that can be separated is also related to the number of carriers and the techniques used to detect and separate signals. For example, in time-domain processing, the signals may overlap each other. A simple multi-user detector (included in the receiver 200) may separate the overlapping signals to provide a substantial increase in bandwidth efficiency. Similarly, spectral overlap of orthogonal carriers improves the spectral efficiency of the communication protocol. Spatial interferometry multiplexing is a type of multi-user detection that separates signals received by spatially diverse, angle-diverse, or polarization-diverse receivers by canceling interference from the desired signals. Combining spatial interferometry multiplexing and multi-user detection based on a different diversity parameter can enhance capacity, enhance diversity, or enhance both capacity and diversity benefits.

Figure 27:
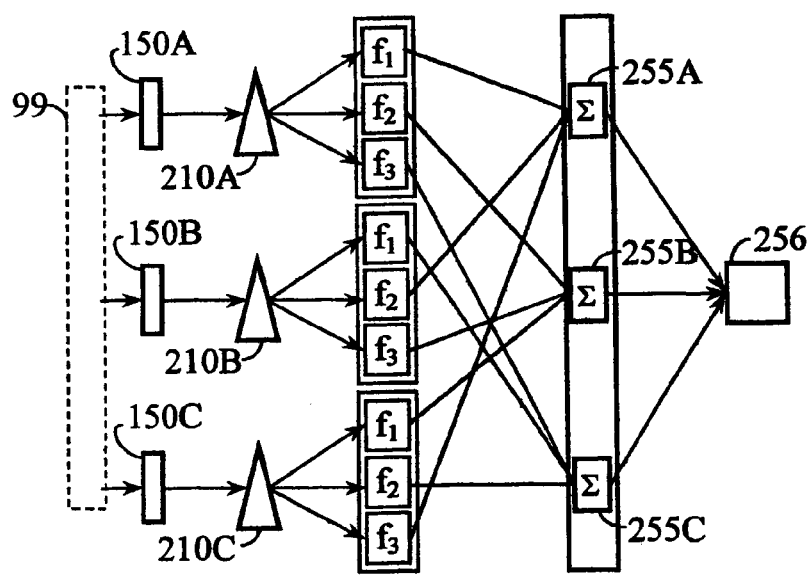
FIG. 27 is a schematic of a receiver 200 that receives multicarrier signals and achieves benefits of spatial diversity, frequency diversity, and capacity enhancement of spatial interferometry multiplexing.

FIG. 27 shows a receiver 200 that receives multicarrier signals and achieves benefits of spatial diversity, frequency diversity, and capacity enhancement of spatial interferometry multiplexing. The receiver 200 has a plurality of couplers 150A, 150B, and 150C coupled to a communication channel (not shown) to generate a plurality of samples of multicarrier signals. The communication channel (not shown) may be a waveguide or wireless channel. The multicarrier signals received at each coupler 150A, 150B, and 150C are separated by a diversity-parameter demultiplexer 210A, 210B, and 210C.

In a WDM system, the demultiplexers 210A, 210B, and 210C are wavelength demultiplexers. In a wireless multi-carrier system where each carrier is defined by its frequency, the demultiplexers 210A, 210B, and 210C are filter banks or frequency-separation processes that spectrally decompose the received signals into a set of frequency bins. A frequency bin represents the frequency band of a filter in the filter bank. The demultiplexers 210A, 210B, and 210C may include down converters, such as heterodyne or homodyne systems (not shown) to recover modulated information signals from each carrier or to convert each carrier to a common carrier signal. A common carrier signal may be defined by an intermediate frequency. The demultiplexers 210A, 210B, and 210C may provide orthogonal outputs (such as separate carrier frequencies) or non-orthogonal outputs in which at least one separated carrier is not entirely separated from at least one other carrier.

Each of the separated carriers is coupled into at least one of a plurality of weight-and-sum systems 255A, 255B, and 255C. In this case, each separated carrier from each demultiplexer 210A, 210B, and 210C is coupled into different weight-and-sum systems 255A, 255B, and 255C. If the number of weight-and-sum systems 255A, 255B, and 255C exceed the number of carriers, then multiple carriers from at least one of the demultiplexers 210A, 210B, and 210C may be coupled into at least one weight-and-sum system 255A, 255B, and 255C. The weights applied by the weight-and-sum systems 255A, 255B, and 255C may be deterministic or adaptive. Delay or phase-alignment units (not shown) may be incorporated into the weight-and-sum systems 255A, 255B, and 255C. Signal outputs from each of the weight-and-sum systems 255A, 255B, and 255C include at least one substantially isolated information signal $s_n(t)$. The weight-and-sum systems 255A, 255B, and 255C may include filters (not shown) or digital signal processing systems (not shown) to enhance reception of desired signals and mitigate interference and noise. The signal outputs from the weight-and-sum systems 255A, 255B, and 255C may optionally be coupled into a multi-user detector 256.

The receiver shown in FIG. 27 may be adapted to include a larger number of couplers (such as couplers 150A, 150B, and 150C) than carrier signals. The number of transmitter couplers and the number of receiver couplers may each exceed the number of carrier signals transmitted or received by each coupler. The couplers may be spatially separated antennas, array processors, or optical couplers. Although the couplers 150A, 150B, and 150C shown in FIG. 27 are spatially separated, the couplers 150A, 150B, and 150C may have any type of diversity, such as spatial, directionality, polarization, path, phase-space, time, or code diversity. The couplers 150A, 150B, and 150C may be diverse in more than one diversity parameter. Similarly, the carriers may have any combination of diversity parameters.

Carrier signals shown in FIG. 26 and FIG. 27 are represented as multi-frequency (or multi-wavelength) signals. These carriers (as well as carriers represented in other figures) may be coded. For example, a group of direct-sequence CDMA codes may be created from the appropriate selection of weights applied to each of the carriers. Although coded, the carriers are still redundantly modulated with information signals. The weight-and-sum systems 255A, 255B, and 255C shown in FIG. 27 may include one or more correlators (not shown) and/or one or more matched filters (not shown) for acting on either or both the time-domain and the frequency-domain signals resulting from the carriers. The receiver 200 in either FIG. 26 or FIG. 27 may perform multi-user detection between either or both the time-domain and frequency-domain coded carrier signals.

Figure 28A:
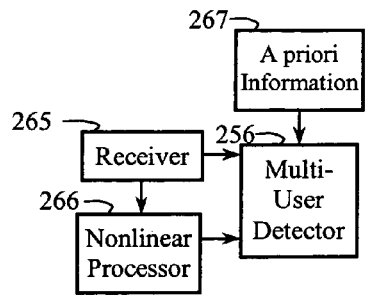
FIG. 28A is a diagram of a receiver 200 that receives a deficient number of receive signals 265 (i.e., equations) and applies a nonlinear process 266 to at least one of the equations to generate one or more additional algebraically unique equations.

Linear cancellation processes (e.g., weight-and-sum processes) require a number of algebraically unique equations that equals or exceeds the number of unknown values. FIG. 28A shows a receiver 200 that receives a deficient number of receive signals 265 (i.e., equations) and applies a non-linear process 266 to at least one of the equations to generate one or more additional algebraically unique equations. The nonlinear equation(s) have more than one solution. Therefore, some information about the unknowns (such as possible values) is required to explicitly solve the equations. A multi-user detector 256 processes the equations. This processing is supported by information about the unknowns 267, which is input to the multi-user detector 256. Information about the unknowns may be acquired through training or estimation processes.

Figure 28B:
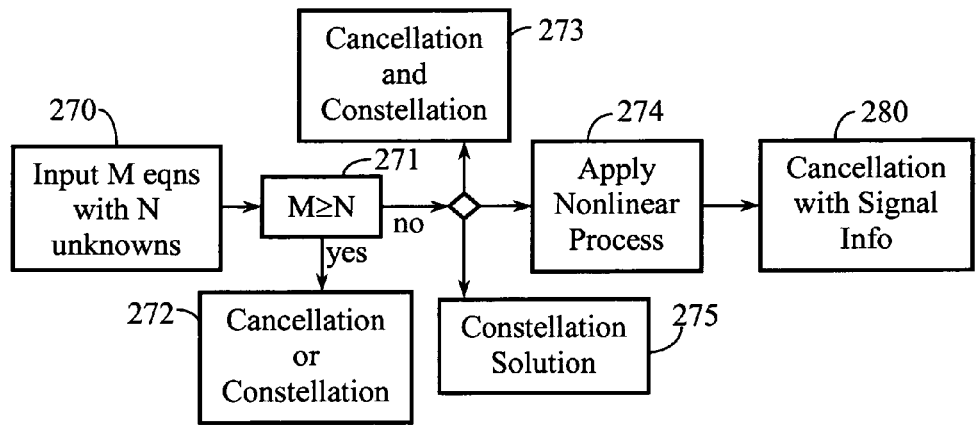
FIG. 28B is a process diagram that shows steps for separating unknown signals in a plurality of received signals.

FIG. 28B shows steps of a method for separating unknown signals in a plurality of received signals. A number M of equations having N unknown signals is received in a first step 270. A determination of $M \geq N$ is made in a second step 271. If the result is "yes," the equations may be processed by cancellation and/or constellation methods 272. If the result is "no," the equations may be processed by a combined cancellation and constellation process 273, a constellation process 275, or a cancellation and/or constellation method that uses a nonlinear process 274. The nonlinear process 274 may be applied to at least one of the equations to provide an additional number of equations. The equations are passed on to a cancellation step 280 that uses information about at least one of the unknowns (such as possible values) to explicitly solve the equations.

Figure 29:
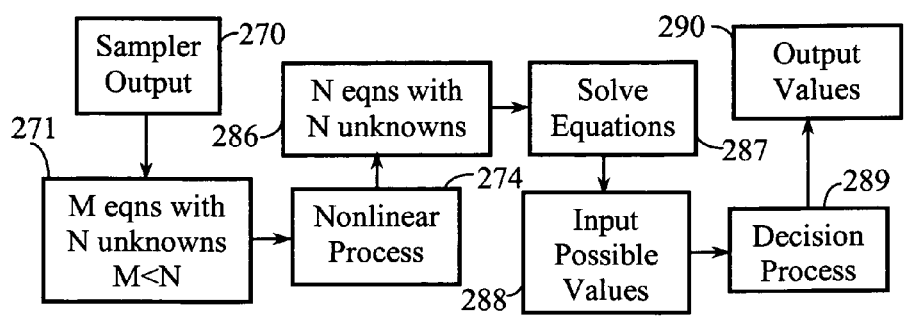
FIG. 29 is a process diagram that describes a method of solving M linear equations having N unknown signals where M<N.

FIG. 29 illustrates a method of solving M linear equations having N unknown signals where M<N. M received signals are obtained from a sampling step 270. A sampler (not shown) is used to provide a plurality of samples (received signals) that have linear combinations of at least one of the N unknown signals. The number M of samples is compared to the number N of unknowns in a comparison step 271. If M<N, a nonlinear processing step 274 acts on at least one of the samples. An output step 286 provides one or more additional algebraically unique equations (which are nonlinear equations) such that $M \geq N$. An equation-solving step 287 provides solutions to the M equations. However, at least one solution contains more than one set of possible values. An information step 288 involves submitting additional information about the unknown signals (such as possible values for the unknowns or relationships between the values of the unknowns) so that the equations can be solved explicitly (or at least used to provide estimates having a high degree of accuracy) in a decision step 289. The values of the unknowns are output in an output step 290.

Many of the interferometry-multiplexing protocols (which use interference cancellation and other multi-user detection schemes) achieve increased bandwidth efficiency by indirectly exploiting the dimension of power. For example, differential modulation schemes require greater power levels to enhance capacity while maintaining the same BER or SNR as simple modulation. For example, the SNR of an M-ary amplitude modulation (AM) scheme (such as quadrature AM) depends on the difference between the AM steps. BER or SNR in a interferometry-multiplexing protocol depends on the difference between signal levels of the desired signal and the interference (which may be other desired signals). Also, the additional antennas used in spatial interferometry multiplexing cause increased noise levels.

Figure 30:
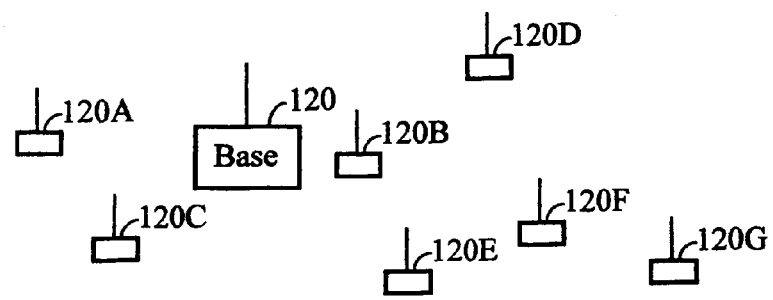
FIG. 30 is a diagram of a base station and a plurality of transceivers that may use a combination of differential modulation and spatial interferometry multiplexing to achieve enhanced system capacity.

M-ary AM requires an approximately doubling of the required system power for each increment in the number M. The system power ranges from proportions of 0 to $2^{M-1}$ depending on the transmitted data symbols. A multiple-access version of M-ary AM is differential-ASK modulation. The most basic implementation of differential ASK involves each of a plurality N of transceivers (such as transceivers 121A to 121G shown in FIG. 30) transmitting N different information signals that each have a binary set of values received at one or more transceivers (such as a base transceiver 120). The "on" value of each $n^{th}$ received signal corresponds to a unique signal level, which may be proportional to $2^n$ where n=0, ... (M−1). The "off" value of each transmitted signal is zero. In order to optimize power conservation, nearby transceivers 121A, 121B, and 121C may generate the highest-power received transmissions at the base transceiver 120.

Differential-modulation techniques may be used in array systems where multipath fading, shadowing, and other channel effects can assist in the differential qualities of the received signals to optimize power conservation. A more complex version of the differential-ASK protocol uses more than two signal levels for each transceiver.

Figure 31A:
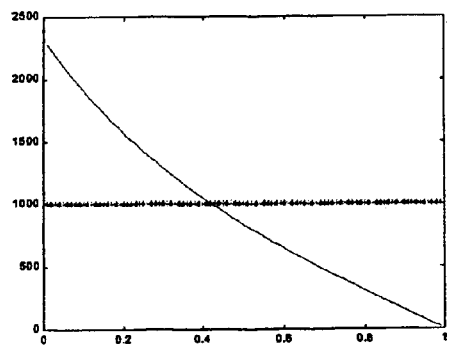
FIG. 31A is a plot of SNR for signals separated from a 3-element array for different levels of multi-user interference.
Figure 31B:
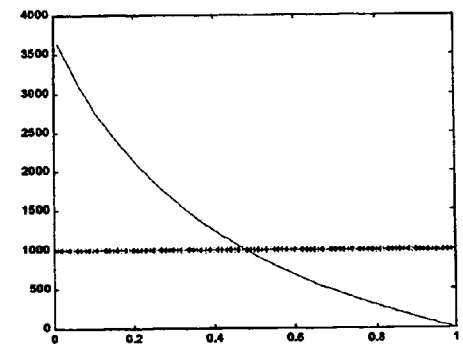
FIG. 31B is a plot of SNR for signals separated from a 4-element array for different levels of multi-user interference.

FIG. 31A and FIG. 31B show SNR variations of signals separated from a 3-element array and a 4-element array, respectively. The y-axis shows SNR and the x-axis indicates average interference as a fraction of the desired signal level received by an array element. The received power level for each desired signal is set to the average power corresponding to the differential ASK that supports the same number of users (channels). A SNR of 30 dB is an arbitrary baseline set for differential-ASK performance. A SNR of 30 dB or higher is achieved by a 3-element array for average interference levels below 0.42. A 4-element array exceeds differential-ASK SNR for average interference levels below 0.48. Although there are conditions in which an interferometry technique (such as spatial interferometry multiplexing) provides superior power efficiency and/or signal quality compared to differential-modulation techniques, differential modulation (such as differential ASK) does not require multiple antennas or cancellation systems.

Figure 32:
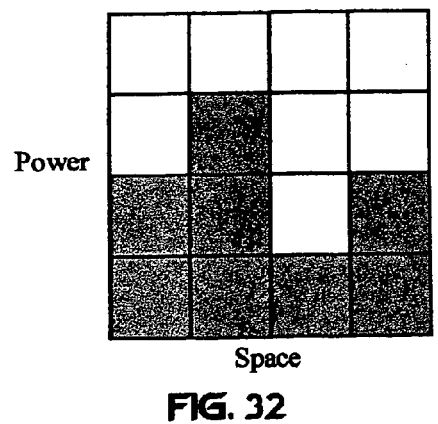
FIG. 32 is a plot of a two-dimensional signal space comprised of a spatial dimension and a differential power dimension.

FIG. 32 shows a two-dimensional signal space comprised of a spatial dimension and a differential-power dimension. The signal space can be designed to achieve an optimal compromise between several factors including system complexity, power efficiency, BER or SNR, and stability. Diversity parameters may be used to enhance signal quality. For example, effects of the multipath-fading channel can be mitigated by providing time-domain signals with frequency diversity. The signal space can be implemented to optimize operating characteristics, such as, but not limited to power efficiency, BER, SNR, signal to noise plus interference, and signal strength.

In waveguide and/or wireless communications, a remote transceiver may communicate a desire to initiate communications to a central unit or another transceiver. The central unit or other transceiver may respond with information indicating phase shifts or delays to be applied to the transmitted signals to synchronize the transmissions with respect to other transmissions that the transceiver is receiving.

Figure 33:
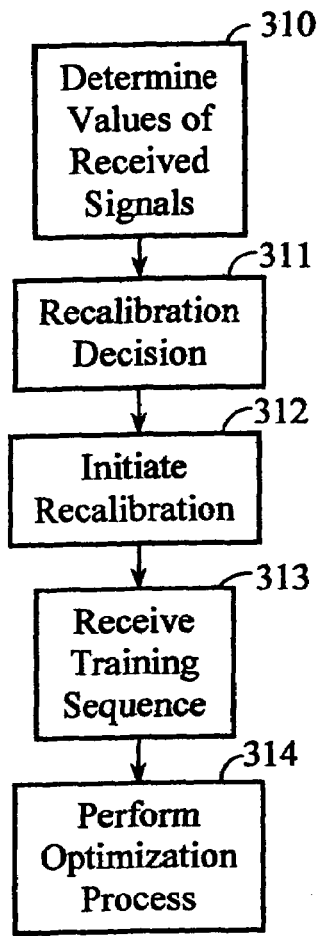
FIG. 33 is a process diagram that shows a method of calibrating weights in a multi-user detector.

A similar type of feedback may be used to optimize either or both transmitter and receiver parameters. FIG. 33 shows a process for calibrating weights in a multi-user detector (not shown), such as a canceller or constellation processor. A first step 310 involves determining the values of received signals during normal transmissions. This is performed by a cancellation and/or constellation method. A second step 311 involves making a decision on whether to initiate recalibration of the processor weights. The decision step 311 is made based on analysis of at least one parameter, such as BER or other diagnostics, established benchmarks, process-control signals, or timers. The decision step may be made based on either internal or external parameters. If one or more predefined conditions are met, an initiation step 312 starts a recalibration sequence. The initiation step 312 may convey a message to one or more transmitters to initiate calibration, or training sequences may be initiated at predetermined intervals, in which case, the initiation step 312 only involves the receiver preparing itself for calibration.

Known training signals are received in a receiving step 313, which is followed by an optimization step 314. In the optimization step 314, an optimization technique (defined previously) is used to adjust the weights based on one or more criteria that are balanced or optimized.

Figure 34:
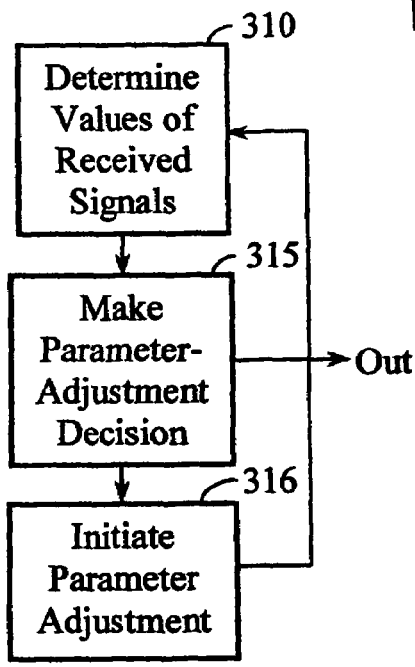
FIG. 34 is a process diagram that shows a looped optimization process.

A looped optimization process is shown in FIG. 34. Values of received signals are determined in a first step 310. A decision step 315 may involve making a decision on which parameter to adjust on either or both the receiver and a remote transmitter, and how to adjust the parameter (e.g., magnitude and/or direction). The decision step 315 may make a decision to break out of the loop and return to a data transmission/reception mode. The decision step 315 is followed by a parameter-adjustment step 316 in which one or more parameters are adjusted, or control signals are generated that result in parameter adjustment. Control may be returned to the first step 310.

Training sequencers may be used in transmitters to transmit training sequences consisting of predetermined signals. The training sequences are processed by receivers (as described in FIG. 33 and FIG. 34) to adjust weights applied to received signals. Weights are applied to optimize the desired signal. The optimization process may be performed with respect to signal-to-noise, signal-to-interference, signal-to-noise-plus-interference, bit-error rate, or any type of measurement or computation that indicates signal quality. A training sequence may be transmitted in a parallel channel, or the training sequence may be part of a received signal. For example, amplitude measurements of a constant-modulus signal may be regarded as a training sequence. The optimization process may be performed by either or both transmitters and receivers. In open-loop processing, a transceiver analyzes received signals and adjusts its transmissions to compensate for the channel. A closed-loop process involves feedback between a receiver and a transmitter. The closed-loop approach is more robust to changes in the propagation medium.

Figure 35:
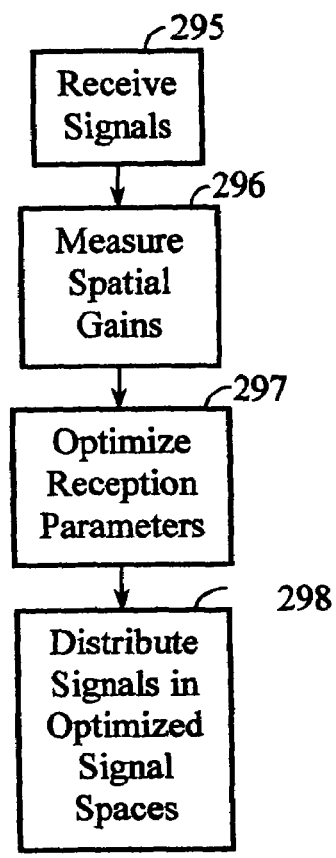
FIG. 35 is a process diagram that outlines a method of adjusting reception parameters and assigning transmissions to signal spaces in order to optimize system-operating parameters.

FIG. 35 illustrates a method of adjusting reception parameters and assigning transmissions to signal spaces in order to optimize system-operating parameters. Signals are received in a first step 295. The signals may be information or training signals. The spatial gain(s) of the received signals are determined in a measurement step 296. Signal parameters are optimized in an optimization step 297. The optimization step 297 includes optimizing signal parameters (such as SNR, signal power, and BER). A second optimization step 298 includes distributing signals into optimized signal spaces. The optimization is based on system parameters (such as power efficiency and system complexity).

Although the signal space shown in FIG. 32 has only two dimensions, signal spaces may have three or more dimensions. Signal-space axes may include any diversity parameter or combination, including differential-modulation dimensions. Although differential ASK is shown, any type of differential modulation scheme may be used including hybrid schemes that combine different types of modulation schemes in at least one form of differential modulation.

Multiple forms of diversity may be included in the communication systems described in this specification. These forms of diversity may be used for either or both signal enhancement and capacity increases. Each diversity parameter may be dedicated to one particular use of diversity, or the diversity parameters may be adjusted to provide an optimal combination of both signal-enhancement benefits and capacity improvements. In cancellation and constellation systems, the number of samples representing linear and nonlinear combinations of unknown signals is increased by providing additional diversity dimensions. One example shown in the specification describes an addition of spatially separated frequency-diversity cancellation systems. However, many other types of diversity-parameter combining may be used to increase the number of algebraically unique combinations of unknown signals or to improve signal quality.

A benefit of generating more samples of unknown signals in a cancellation system includes enabling the values of the unknowns to be determined explicitly. In a constellation system, generating more samples improves the BER of the decision processes. A benefit of constellation methods is that they can be used to obtain signal estimates without the hardware and processing requirements of cancellation methods. A constellation system is scalable to increased numbers of unknowns. Under high demand, a constellation system (like quasi-orthogonal CDMA) enables a graceful degradation of signal quality resulting from increased higher BER. Constellation processing may also be performed in addition to cancellation processing to help determine processing accuracy and to indicate when recalibration is necessary.

In the preferred embodiments, several kinds of interferometry multiplexing are demonstrated to provide a basic understanding of diversity reception and spatial demultiplexing. With respect to this understanding, many aspects of this invention may vary. For example, signal spaces and diversity parameters may include redundantly modulated signal spaces. The antenna arrays may be arrays of individual antennas, a lens system, or a multiple-feed single-dish antenna where each feed is considered to be an individual antenna element. Although only two- and three-element cancellers are shown, cancellation processes may be performed on a larger number of inputs. The complexity of the cancellation process typically increases for larger numbers of inputs. A CPU may be used to perform the weight-and-sum operations or equivalent types of cancellation processes that result in separation of the signals. Although the wireless interface in the invention is described with regard to RF and microwave frequencies, the principles of operation of the invention apply to any frequency in the electromagnetic spectrum. Additionally, a demultiplexer may include combinations of space, frequency, time, phase space, mode, code, and polarization-diversity combining methods. Furthermore, constant-modulus signals may be transmitted in the communication system. Constant-modulus transmissions can simplify the demultiplexing of received signals. In this regard, it should be understood that such variations as well as other variations fall within the scope of the present invention, its essence lying more fundamentally with the design realizations and discoveries achieved than merely the particular designs developed.

This invention claims the methods of controlling signal parameters in multiple diversity dimensions to achieve specific signal processing capabilities (such as diversity benefits and capacity enhancement) in other diversity dimensions. For example, PCT Pat. Appl. No. WO99/41871 describes how different-frequency carriers transmitted from different spatial locations cause a time-varying superposition beam pattern (and a time-varying spatial gain distribution). This enables time-domain processing to yield either or both diversity and capacity benefits.

The foregoing discussion and the claims that follow describe the preferred embodiments of the present invention. With respect to the claims, it should be understood that changes could be made without departing from the essence of the invention. To the extent such changes embody the essence of the present invention, each naturally falls within the breadth of protection encompassed by this patent. This is particularly true for the present invention because its basic concepts and understandings are fundamental in nature and can be broadly applied.

I claim:

1. A receiver system for a waveguide communication system for receiving a transmitted multicarrier signal configured to map each of a plurality of data symbols to a pulse in a pulse sequence characterized by a superposition of carrier signals, including:
   a multicarrier phase adjuster capable of providing phase adjustment to received multicarrier signals,
   a combiner capable of combining the multicarrier signals for producing a data-modulated pulse sequence, and
   a time-domain receiver capable of producing data estimates from the data-modulated pulse sequence.

2. The receiver system recited in claim 1 wherein the multicarrier phase adjuster includes an optical-to-RF converter.

3. The receiver system recited in claim 1 wherein the multicarrier phase adjuster includes a filter bank capable of separating the received multicarrier signal with respect to frequency.

4. The receiver system recited in claim 1 wherein the multicarrier phase adjuster is capable of providing a zero-phase relationship to the received multicarrier signals.

5. A method of receiving a multicarrier signal being configured to map each of a plurality of data symbols to a pulse in a pulse sequence characterized by a superposition of carrier signals, the method including:
   providing for adjusting the multicarrier signal to compensate for multipath,
   providing for combining the multicarrier signal to produce at least one time-domain signal characterized by the plurality of data symbols modulated on a pulse sequence, and
   providing for processing the at least one time-domain signal to detect at least one of the plurality of data symbols.

6. The method recited in claim 5 wherein at least one of providing for adjusting and providing for combining includes separating the multicarrier signal into a plurality of carrier frequency components.

7. The method recited in claim 5 wherein providing for adjusting includes sampling the multicarrier signal.

8. The method recited in claim 5 wherein the superposition of carrier signals comprises at least one of a TDMA signal, a DS-CDMA signal, an MC-CDMA signal, an FHSS signal, and an OFDM signal.

9. The method claim 5 wherein providing for adjusting and providing for combining are implemented with a matched filter.

10. The method recited in claim 5 wherein providing for adjusting and providing for combining are adapted to project the multicarrier signal onto at least one orthonormal basis.

11. The method recited in claim 5 wherein at least one of providing for adjusting and providing for combining is adapted to compensate for channel distortion.

12. The method recited in claim 5 wherein providing for combining includes performing at least one of a set of combining processes, including co-phasing, selective combining, maximal-ratio combining, equal-gain combining, and maximal-selection combining.

13. The method recited in claim 5 wherein at least one of providing for adjusting, providing for combining, and providing for processing is implemented digitally.

14. A multi phase-space detector capable of detecting a plurality of information signals modulated on a plurality of signal phase-spaces that map each of the plurality of information signals to a pulse in a pulse sequence characterized by a superposition of carrier signals, the detector including:
   a coupler coupled to a communication channel, the coupler capable of coupling a plurality of transmitted signals out of the channel to produce coupled signals,
   a frequency sampler capable of separating the coupled signals into a plurality of frequency components, and
   a combining circuit capable of combining the plurality of frequency components to generate at least one pulse sequence modulated with the plurality of information signals.

15. The multi phase-space detector recited in claim 14 wherein the coupler includes an antenna array.

16. The multi phase-space detector recited in claim 14 wherein the frequency sampler is implemented with a filter bank.

17. The multi phase-space detector recited in claim 14 wherein the frequency sampler includes a signal processor adapted to perform at least one Fourier transform.

18. The multi phase-space detector recited in claim 14, further comprising a decoder.

19. The multi phase-space detector recited in claim 14, further comprising at least one N-point invertible transform.

20. The multi phase-space detector recited in claim 14 wherein the combining circuit includes at least one decision module adapted to perform at least one of multi-user detection and multi-channel detection.

21. The multi phase-space detector recited in claim 14 wherein the combining circuit is adapted to perform at least one of a set of combining processes, including co-phasing, selective combining, maximal-ratio combining, equal-gain combining, and maximal-selection combining.

22. The multi phase-space detector recited in claim 14 wherein at least one of the frequency sampler and the combining circuit are implemented with a digital signal processor.

* * * * *